(12) United States Patent
Volin

(10) Patent No.: US 9,603,337 B2
(45) Date of Patent: Mar. 28, 2017

(54) RECONFIGURABLE KENNEL, HAVING STACKABLE, INTERCHANGEABLE, EXPANDABLE, AND SHRINKABLE FEATURES

(71) Applicant: Dee Volin, Fairview, OR (US)

(72) Inventor: Dee Volin, Fairview, OR (US)

( * ) Notice: Subject to any disclaimer, the term of this patent is extended or adjusted under 35 U.S.C. 154(b) by 199 days.

(21) Appl. No.: 14/590,864

(22) Filed: Jan. 6, 2015

(65) Prior Publication Data

US 2016/0157456 A1 Jun. 9, 2016

Related U.S. Application Data

(60) Provisional application No. 62/088,690, filed on Dec. 8, 2014.

(51) Int. Cl.

| *A01K 1/02* | (2006.01) |
|---|---|
| *A01K 1/00* | (2006.01) |
| *A01K 1/03* | (2006.01) |
| *A01K 1/035* | (2006.01) |

(52) U.S. Cl.
CPC .............. *A01K 1/0035* (2013.01); *A01K 1/03* (2013.01); *A01K 1/034* (2013.01); *A01K 1/035* (2013.01)

(58) Field of Classification Search
CPC ...... A01K 1/0035; A01K 1/034; A01K 1/035; A01K 1/03
USPC .... 52/79.12, 79.5; 135/120.3, 909; 446/108, 446/110, 111, 114; 119/491, 492, 494, 119/496, 499, 501, 512, 513, 514, 519, 119/752; 292/10, 17, 19, 249, 76, 80, 292/163, 303
See application file for complete search history.

(56) References Cited

U.S. PATENT DOCUMENTS

| 920,975 | A | | 5/1909 | Minion |
|---|---|---|---|---|
| 3,460,516 | A | | 8/1969 | Leonard |
| 3,490,417 | A | | 1/1970 | Swinney |
| 3,710,761 | A | | 1/1973 | Gregory |
| 3,747,567 | A | * | 7/1973 | De Smit .................. A01K 1/03 |
| | | | | 119/473 |
| 4,195,593 | A | | 4/1980 | Dunn |
| 4,322,925 | A | * | 4/1982 | Geisler, Jr. ........... A01K 1/0035 |
| | | | | 119/482 |

(Continued)

*Primary Examiner* — William Gilbert

(57) ABSTRACT

A unique reconfigurable expandable shrinkable quick-assembly quick-disassembly indoor-outdoor kennel for multiple types of animals comprises stackable, interchangeable, expandable, and shinkable panels, doorframe panel, door panel, single-shaft-clamp-couplers, double-shaft-clamp-couplers, double-shaft-couplers, and double-clamp-couplers. Each of the panels can be used either as a roof panel, a truss panel, a wall panel, a floor panel, a ramp panel, a perch panel, or a storage panel. Each of the couplers is for centering, aligning, coupling, and locking inside the tube ends of at least two panels, to prevent the panels from twisting, bending, and collapsing. The unique indoor-outdoor kennel can be quickly and easily assembled and disassembled by hand, without using any tools, can be easily stored in a car trunk and transported to a park or beach, can be easily configured to form a single-or-multi-level kennel of a large variety of shapes and sizes, and can have at least one convex, flat, or concave roof, which can also function as a storage to store food bags, bowl, toys, pet pad, accessories, leash, etc. for multiple types of pets.

20 Claims, 40 Drawing Sheets

(56) References Cited

U.S. PATENT DOCUMENTS

| | | |
|---|---|---|
| 4,546,728 A | 10/1985 | May |
| 4,729,343 A | 3/1988 | Evans |
| D320,479 S | 10/1991 | Cheval |
| 5,349,924 A | 9/1994 | Hooper, Jr. |
| 5,476,066 A | 12/1995 | Hoffman |
| 5,551,371 A | 9/1996 | Markey |
| 5,967,089 A | 10/1999 | Allen |
| D432,740 S | 10/2000 | Morley |
| 6,446,577 B1 | 9/2002 | Salahor |
| 6,457,438 B1 | 10/2002 | Baker |
| 6,499,434 B1 | 12/2002 | Tyler |
| 6,553,940 B1 | 4/2003 | Powell |
| 7,111,584 B2 | 9/2006 | Wang |
| 7,231,891 B2 | 6/2007 | Wood |
| 7,308,868 B1 | 12/2007 | Borg |
| D614,815 S | 4/2010 | Co |
| 7,827,939 B2 | 11/2010 | Yang |
| 7,827,940 B2 | 11/2010 | Silverman |
| 8,127,718 B2 | 3/2012 | Hoegh |
| 8,141,517 B2 * | 3/2012 | Shimoda ............... A01K 1/034 119/473 |
| 8,240,274 B2 | 8/2012 | Greene |
| D680,696 S | 4/2013 | Hammel |
| 8,438,995 B1 * | 5/2013 | Donahue ............... A01K 1/034 119/452 |
| 8,522,721 B2 | 9/2013 | Bernardini |
| 8,662,020 B1 | 3/2014 | Tecco |
| 2003/0145799 A1 | 8/2003 | Hays |
| 2005/0028745 A1 | 2/2005 | Baillie |
| 2007/0012346 A1 * | 1/2007 | Choi ....................... E04H 15/60 135/114 |
| 2012/0272920 A1 * | 11/2012 | Link ....................... A01K 3/00 119/474 |

\* cited by examiner

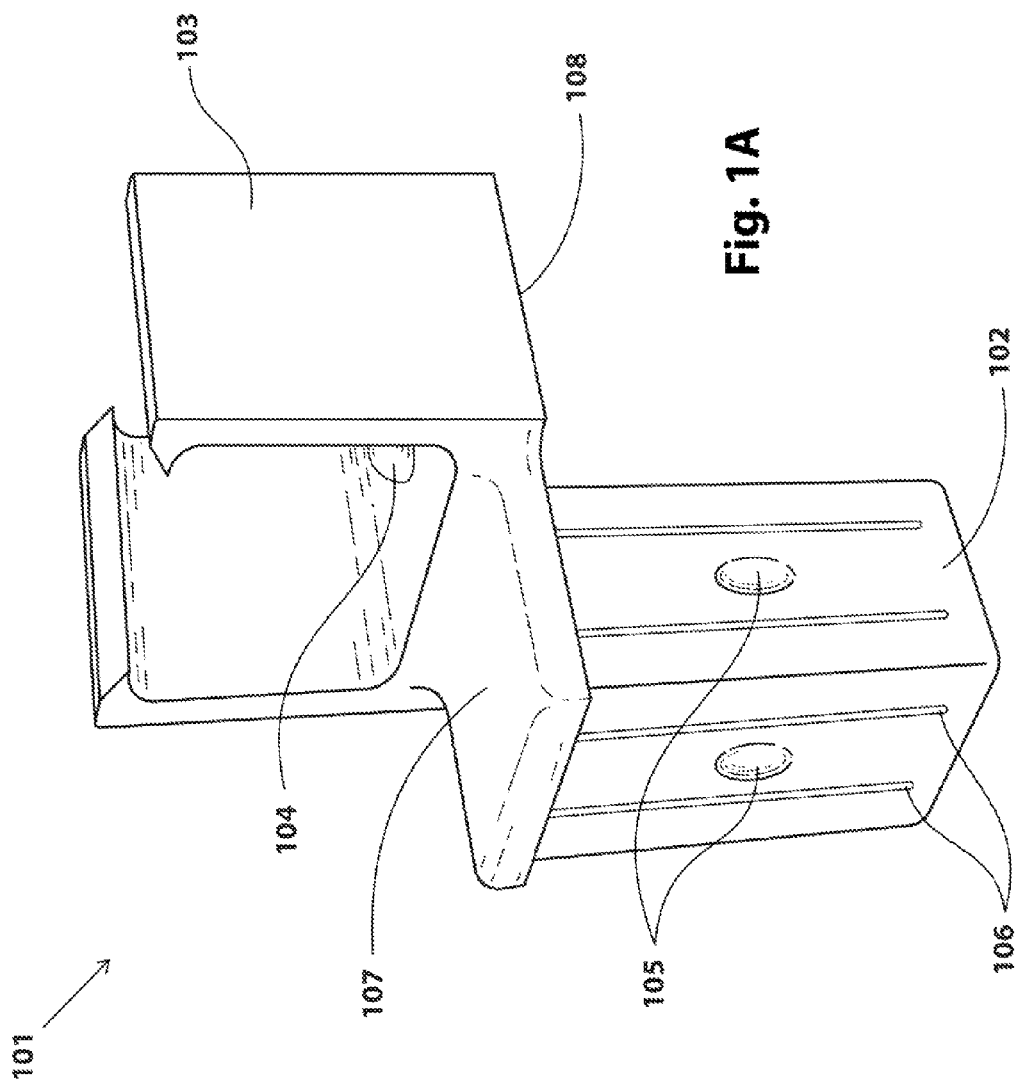

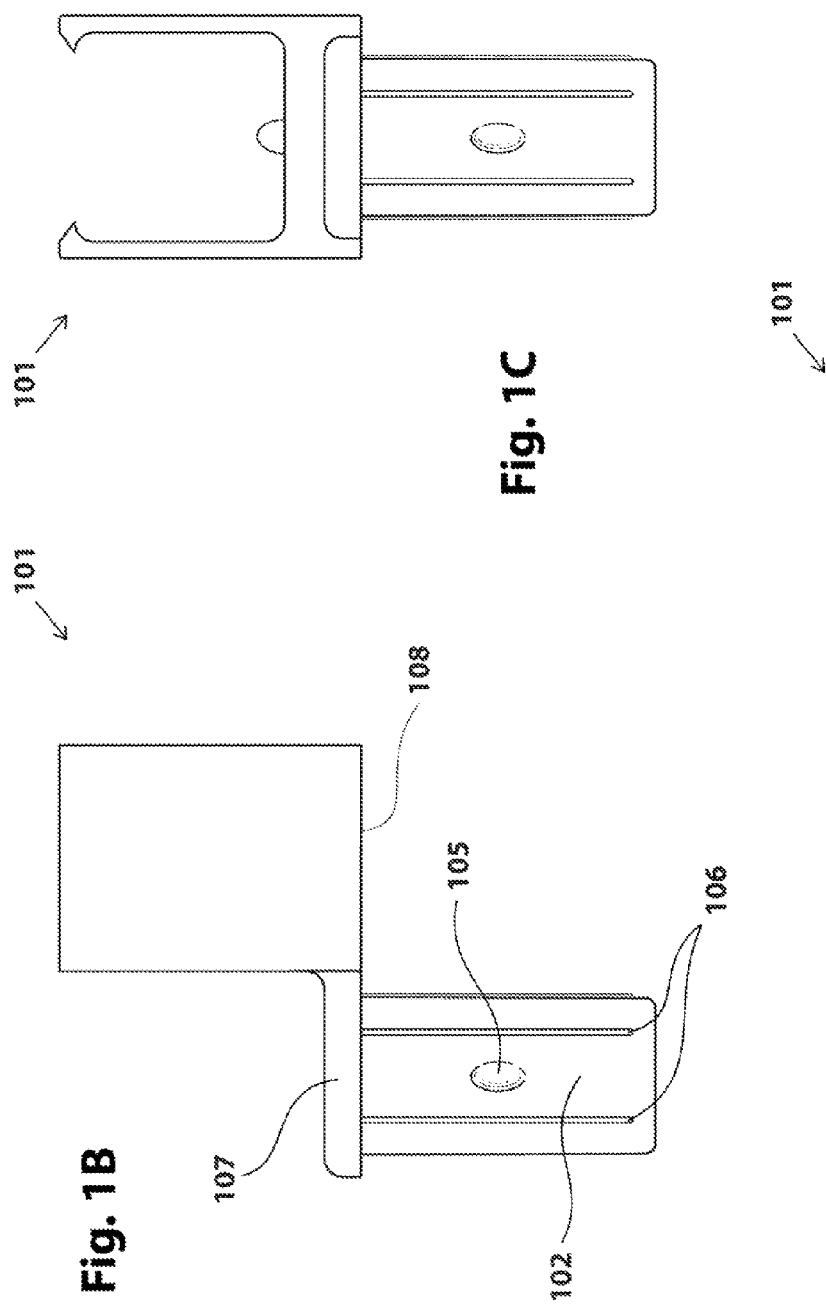

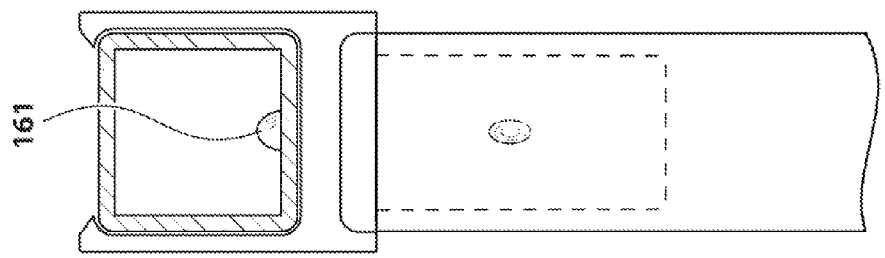
Fig. 1F
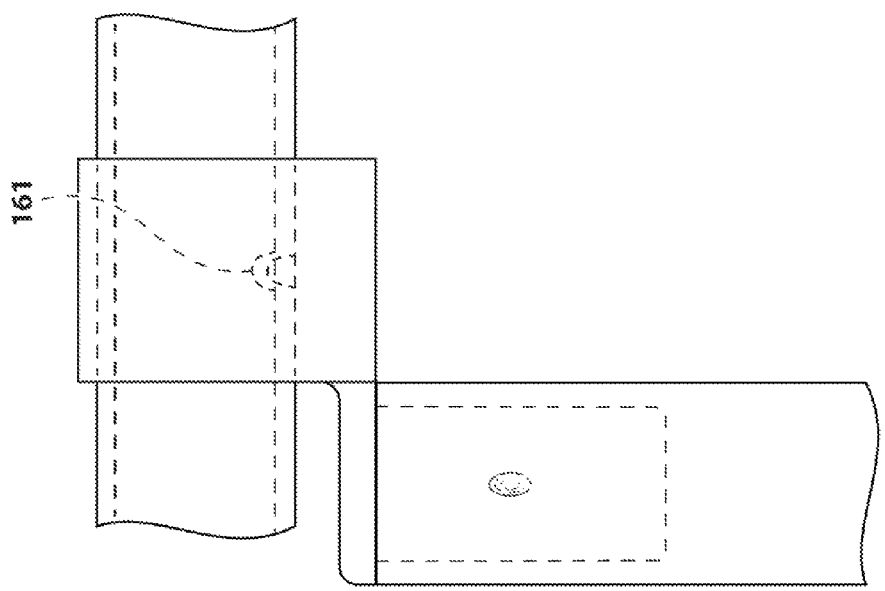
Fig. 1E

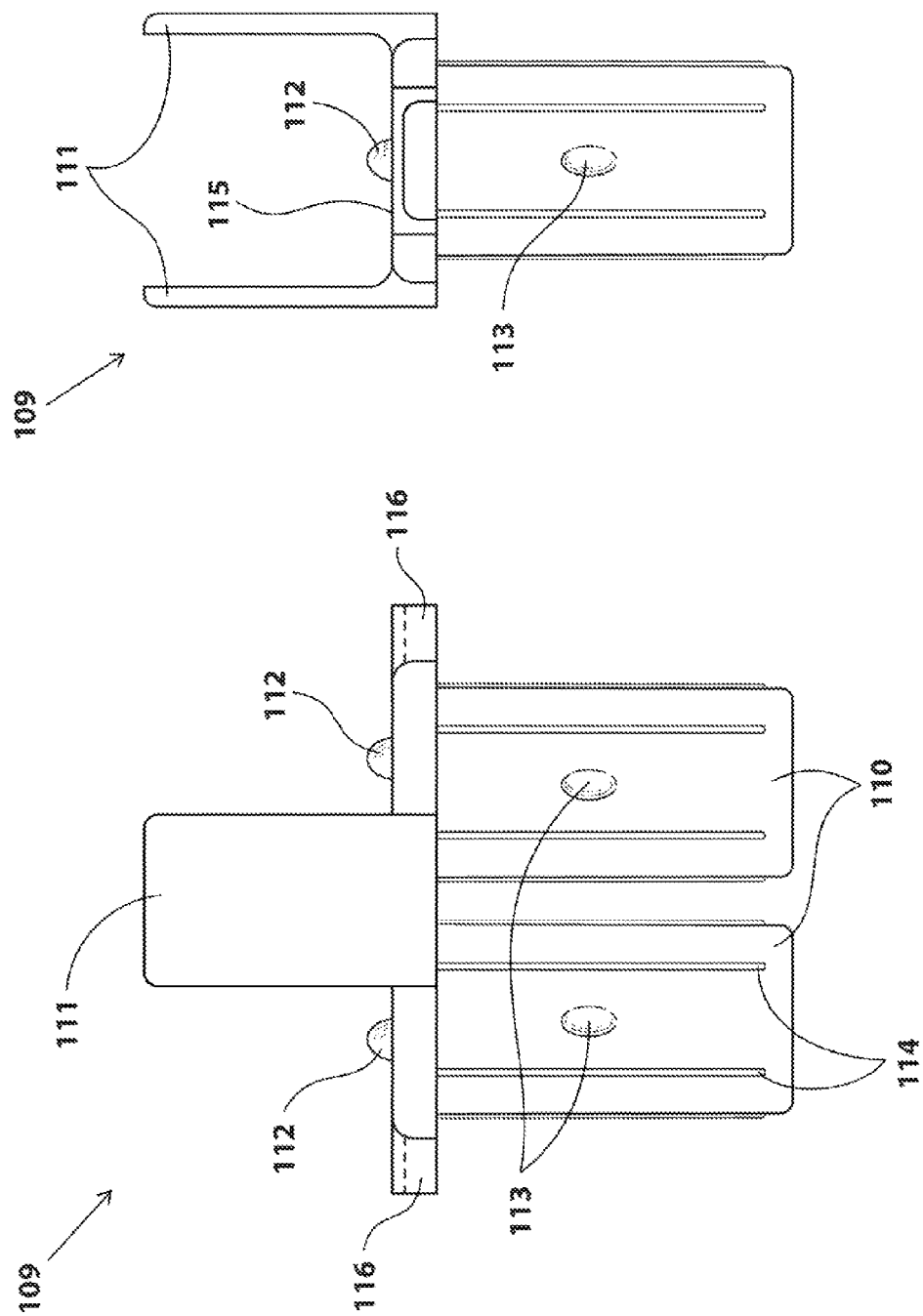

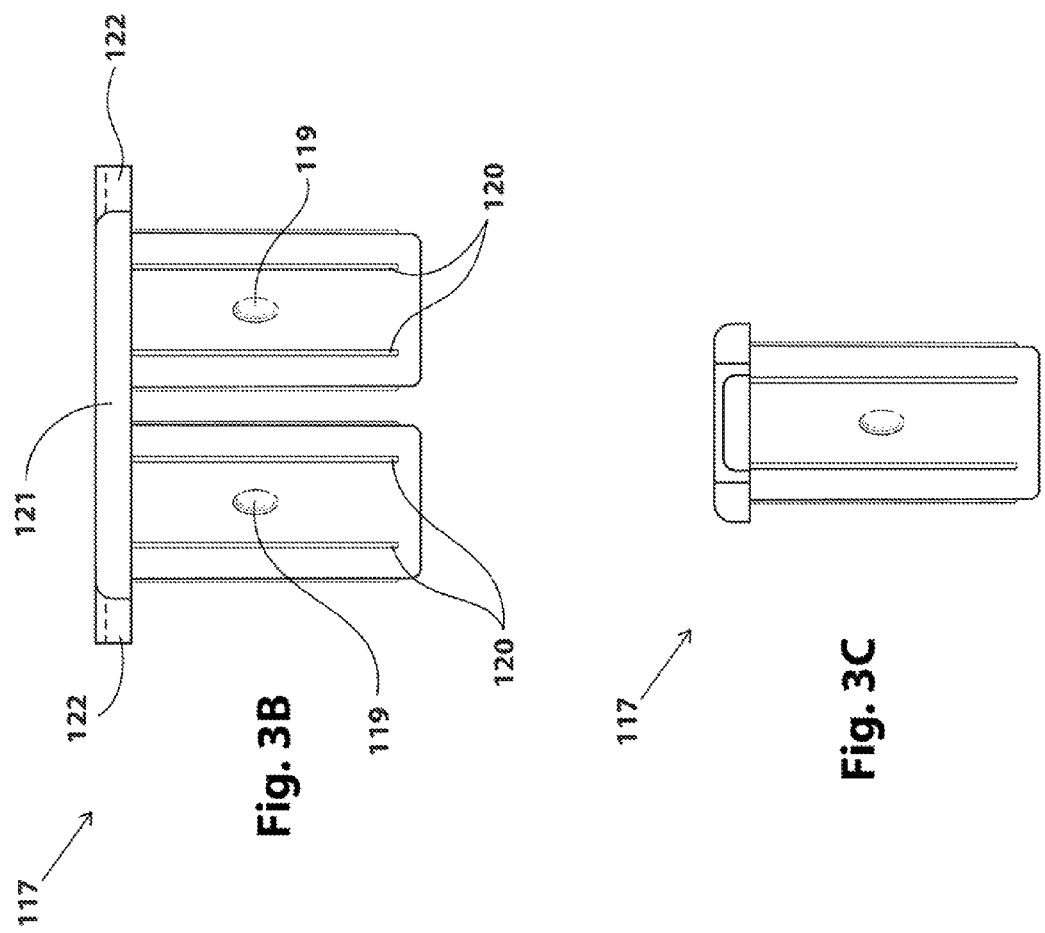

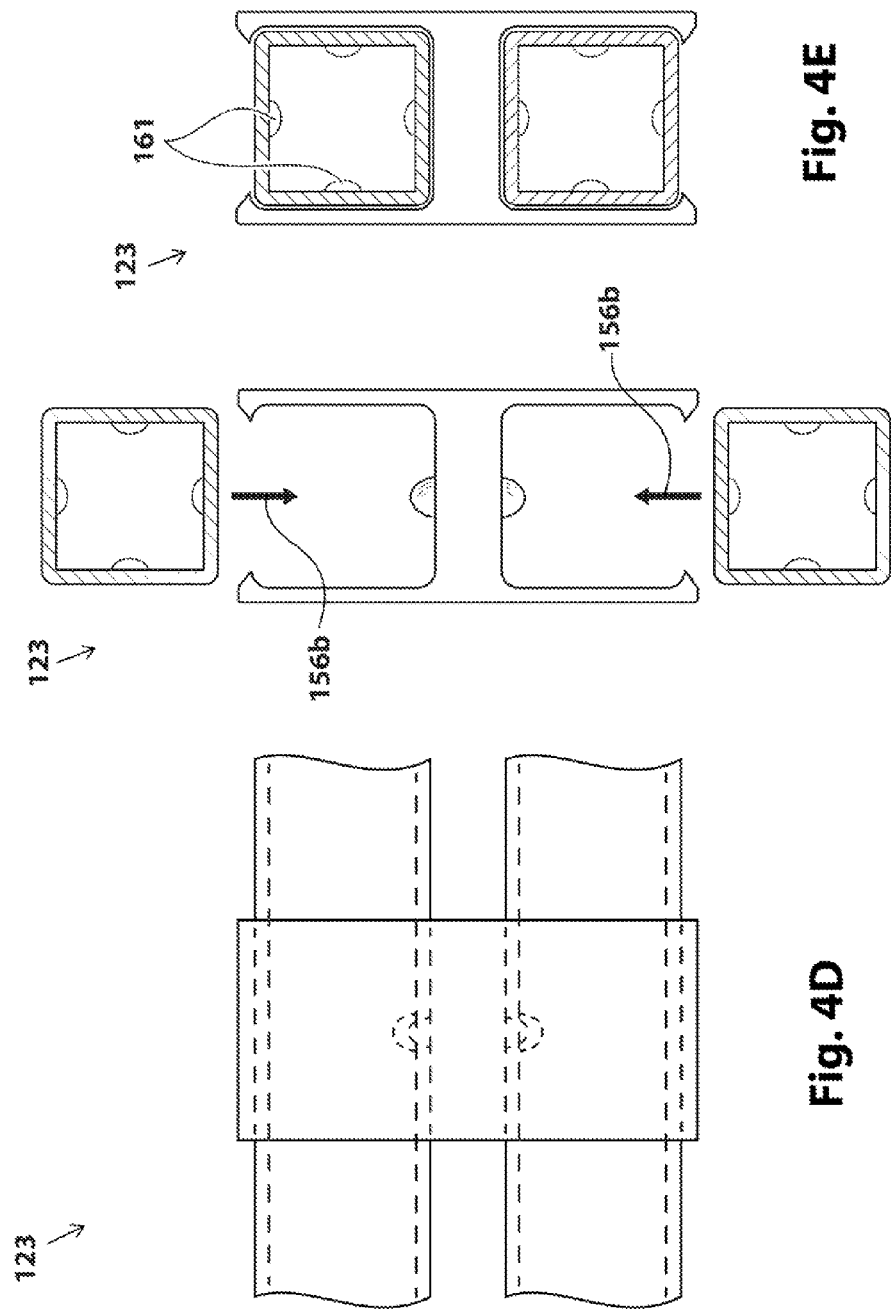

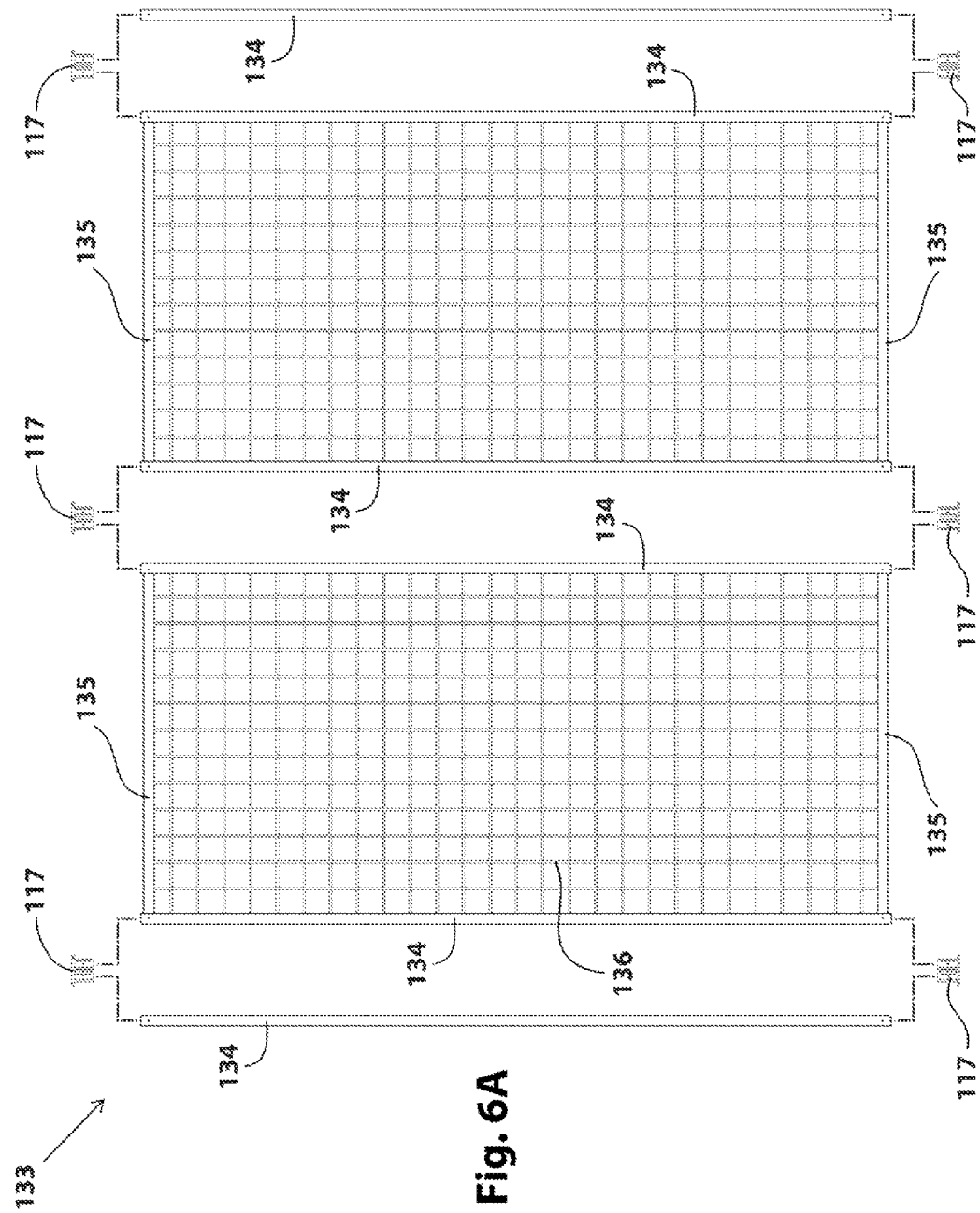

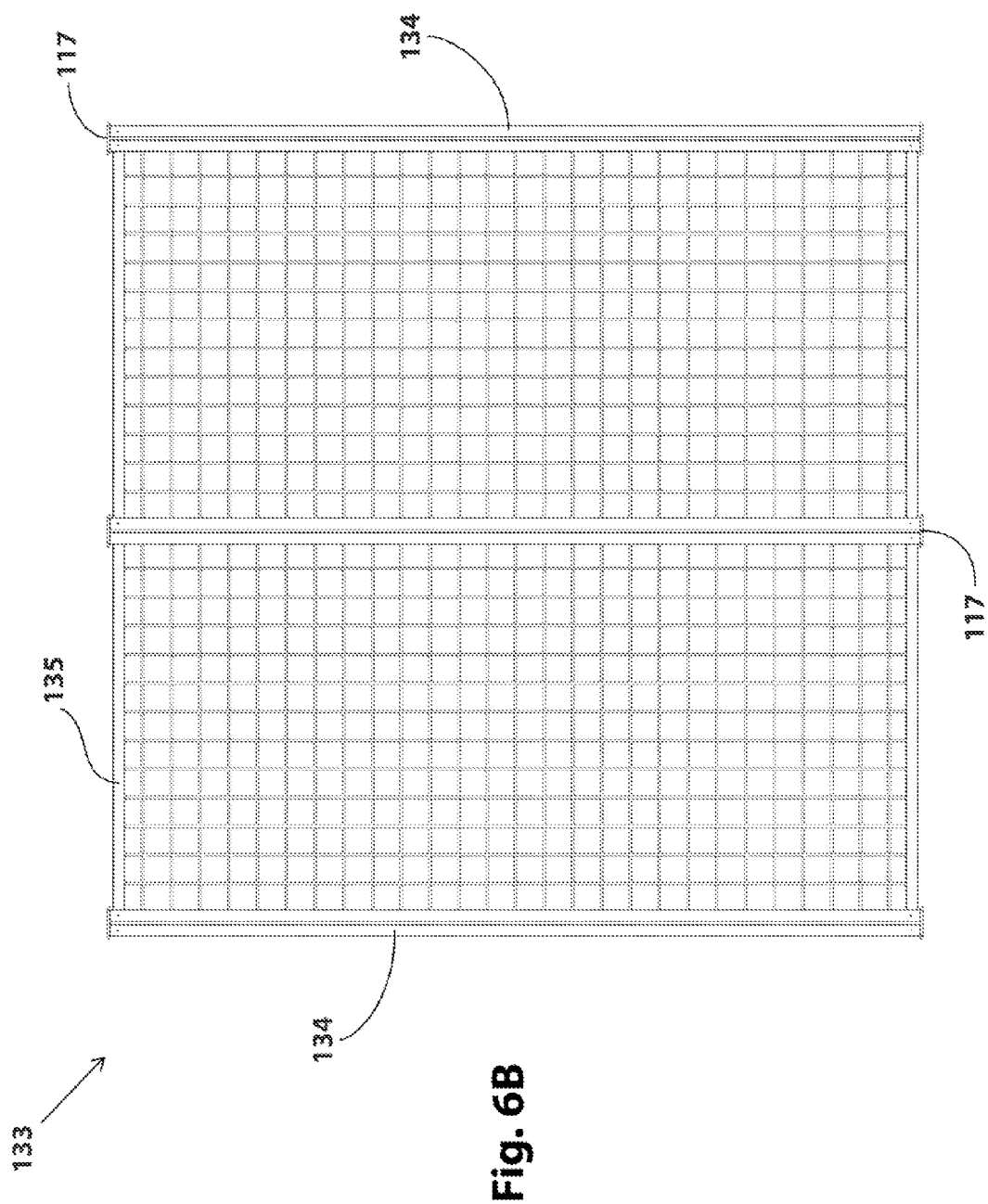

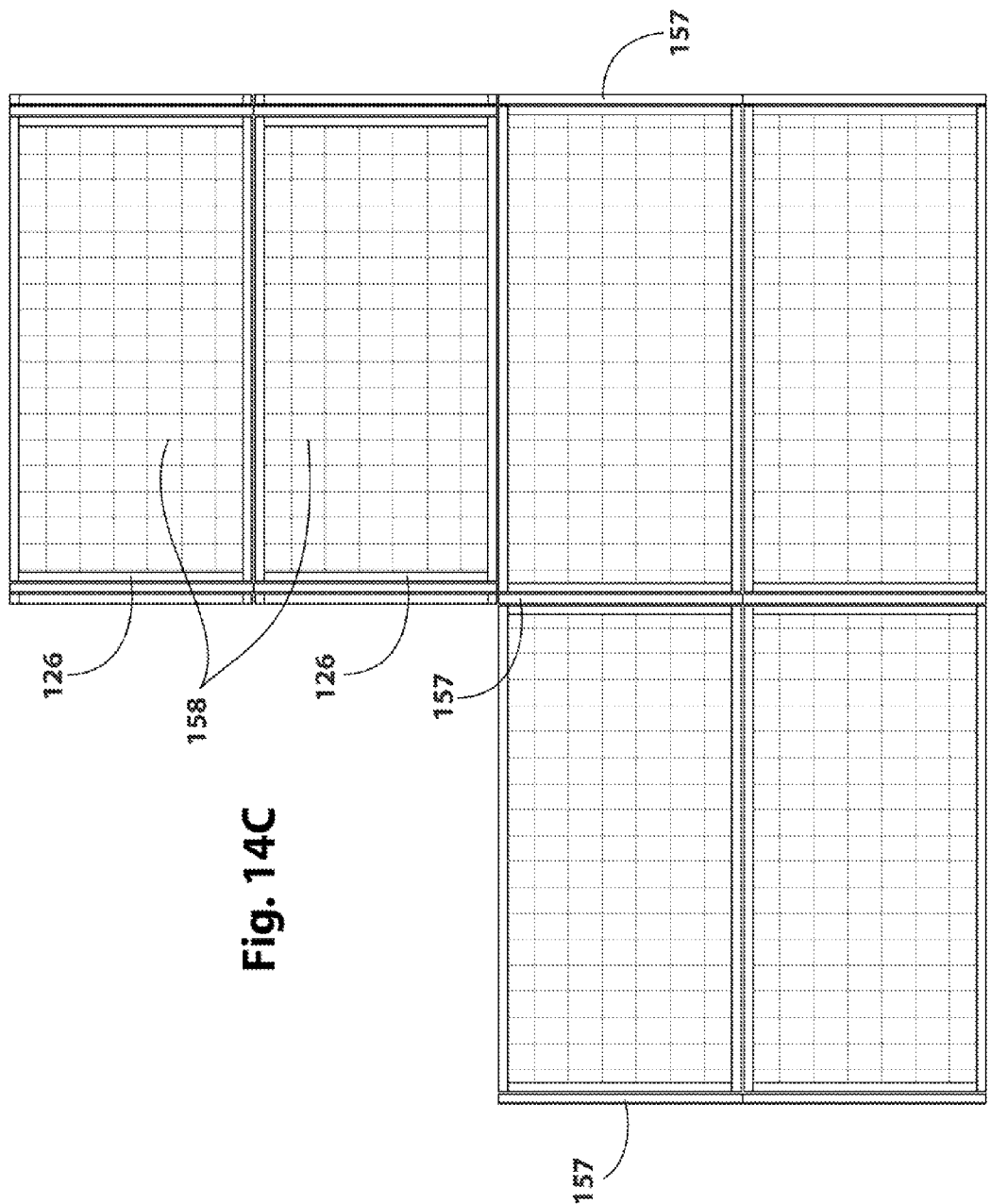

RECONFIGURABLE KENNEL, HAVING STACKABLE, INTERCHANGEABLE, EXPANDABLE, AND SHRINKABLE FEATURES

FIELD OF THE INVENTION

The present invention relates to a unique reconfigurable expandable shrinkable quick-assembly quick-disassembly indoor-outdoor kennel for multiple types of animals, which is quick, easy, and convenient to assemble and disassemble without using any tools, and is durable, reliable, and safe to use. Particularly, the present invention relates to a unique reconfigurable expandable shrinkable quick-assembly quick-disassembly indoor-outdoor kennel, having:
1) Anti-twisting anti-bending system,
2) Self-locking self-centering system, and
3) Stackable, interchangeable, expandable, shrinkable roof panels,
4) Stackable, interchangeable, expandable, shrinkable truss panels,
5) Stackable, interchangeable, expandable, shrinkable wall panels, and
6) Stackable, interchangeable, expandable, shrinkable floor panels.

DESCRIPTION OF THE PRIOR ART

A number of adjustable gates have been introduced.
U.S. Pat. No. 0,920,975, patented 1909 May 11, to J. S. Minion;
U.S. Pat. No. 3,460,516, patented 1969 Aug. 12, to E. C. Leonard;
U.S. Pat. No. 3,490,417, patented 1970 Jan. 20, to E. P. Swinney;
U.S. Pat. No. 3,710,761, patented 1973 Jan. 16, to Frederick S. Gregory;
U.S. Pat. No. 4,195,593, patented 1980 Apr. 1, to Troy Dunn;
U.S. Pat. No. 4,546,728, patented 1985 Nov. 15, to Gary A. May;
U.S. Pat. No. 4,729,343, patented 1988 Mar. 8, to Lydia Evans;
U.S. Pat. No. 5,349,924, patented 1994 Sep. 27, to Eugene J. Hooper, Jr.;
U.S. Pat. No. 5,476,066, patented 1995 Dec. 19, to Oneal M. Hoffman;
U.S. Pat. No. 5,551,371, patented 1996 Sep. 3, to Dennis P. Markey;
U.S. Pat. No. 5,967,089, patented 1999 Oct. 19, to Gerald M. Allen;
U.S. Pat. No. 6,446,577, patented 2002 Sep. 10, to Brian K. Salahor;
U.S. Pat. No. 6,457,438, patented 2002 Oct. 1, to Michael D. Baker;
U.S. Pat. No. 6,499,434, patented 2002 Dec. 31, to Steven Tyler;
U.S. Pat. No. 6,553,940, patented 2003 Apr. 29, to Tony A. Powell;
U.S. Pat. No. 7,111,584, patented 2006 Sep. 26, to Steve Wang;
U.S. Pat. No. 7,231,891, patented 2007 Jun. 19, to Gregory M. Wood;
U.S. Pat. No. 7,308,868, patented 2007 Dec. 18, to Jerry J. Borg;
U.S. Pat. No. 7,827,939, patented 2010 Nov. 9, to Leon Yang;
U.S. Pat. No. 7,827,940, patented 2010 Nov. 19, to Stephen Silverman;
U.S. Pat. No. 8,127,718, patented 2012 Mar. 6, to Thomas B. Hoegh;
U.S. Pat. No. 8,240,274, patented 2010 May 11, to Michael E. Greene;
U.S. Pat. No. 8,522,721, patented 2013 Sep. 3, to Pietro Bernardini;
U.S. Pat. No. 8,662,020, patented 2014 Mar. 4, to Peter V. Tecco;
U.S. Pat. No. D320,479, patented 1991 Oct. 1, to Benoit Cheval;
U.S. Pat. No. D432,740, patented 2000 Oct. 24, to Patrick Morley;
U.S. Pat. No. D614,815, patented 2010 Apr. 27, to Alix K. Co;
U.S. Pat. No. D680,696, patented 2013 Apr. 23, to Jason Hammel;
U.S. Publication. No. 20030145799, published 2003 Aug. 7, to Rodger Hays; and
U.S. Publication. No. 20050028745, published 2005 Feb. 10, to Robert A. Baillie disclose a variety of inventions related to animal kennels.

The prior art have failed to solve many problems associated with such animal kennels, as follows:
1) No prior art mentions or discloses any kennel having unique offset couplers, which can offsettingly couple together the tube ends of the roof panels, truss panels, wall panels, floor panels, door panels, ramp panels, and perch panels, to allow all the panels to be stackable, interchangeable, expandable, and shrinkable. Therefore, the prior-art kennels are expensive to make, are inconvenient to use, and are time-consuming to assemble and disassemble.
2) No prior art mentions or discloses any kennel having unique centering, aligning, and coupling couplers, which can center, align, and couple all the roof panels, truss panels, wall panels, floor panels, door panels, ramp panels, and perch panels. Therefore, the prior-art kennels quite often twist, bend, warp, and collapse when pushed by pets.
3) No prior art mentions or discloses any kennel having single-shaft-clamp-couplers, double-shaft-clamp-couplers, double-shaft-couplers, and double-clamp-couplers, which can quickly and easily couple and decouple (at any angles) the roof panels, truss panels, wall panels, floor panels, door panels, ramp panels, and perch panels (without using any tools), and require no maintenance. Therefore, the prior-art kennels require tools and a lot of time to be assembled and disassembled.
4) No prior art mentions or discloses any kennel having single-shaft-clamp-couplers, double-shaft-clamp-couplers, double-shaft-couplers, and double-clamp-couplers, to be quickly and easily assembled and disassembled by hand (without using any tools). Therefore, the prior-art kennels require tools, tool materials, tool production costs, and cause personal injuries from using tools.
5) No prior art mentions or discloses any kennel having unique coupler, which can perform four functions, at the same time, of sealing the sharp edges of the tube ends of all the panels, coupling all the panels, preventing all the panels from sliding and spreading apart, and preventing all the panels from twisting, bending, warping, and collapsing. Therefore, the prior-art-kennels cause injuries, and slide and spread apart, twist, bend, warp, and collapse when pushed by pets.
6) No prior art mentions or discloses any kennel having stackable, interchangeable, expandable, and shrinkable roof panels, truss panels, wall panels, floor panels, door panels, ramp panels, and perch panels, all of which can be quickly and easily configured, to have a wide variety of shapes and sizes. Therefore, the prior-art kennels can only be built in a limited number of shapes and sizes.

7) No prior art mentions or discloses any kennel having five unique capabilities of being able to be quickly and easily configured: a) as an enclosed kennel, b) as a pet run, c) as a pet-training pen, d) as a pet-transporting crates, and e) as a pet cage. Therefore, the prior-art kennels waste a lot of materials, labors, time, and money.

8) No prior art mentions or discloses any kennel having scalable capability of being able to be quickly and easily configured: a) as a small kennel for small pets (such as, birds or mice), and b) as a large kennel for large pets (such as, chickens or dogs). Therefore, the prior-art kennels require a lot of storage space, are cumbersome to transport, are impossible to combine into one kennel, and their metallic clamps also rust easily when used outside, which expose their sharp edges, cut pets and pet owners, and cause injuries.

OBJECTS AND ADVANTAGES OF THE INVENTION

The present invention substantially departs from the conventional concepts and designs of the prior art. In doing so, the present invention provides a unique reconfigurable expandable shrinkable quick-assembly quick-disassembly indoor-outdoor kennel for multiple types of animals having many unique and significant features, functions, and advantages, which overcome all the disadvantages of the prior art, as follows:

1) It is an object of the present invention to provide the unique reconfigurable expandable shrinkable quick-assembly quick-disassembly indoor-outdoor kennel, which:
 a) Has stackable, interchangeable, expandable, and shrinkable panels, any of which:
  Can be used as either a roof panel, truss panel, wall panel, floor panel, door panel, ramp panel, perch panel, or storage panel
  (to eliminate the needs for a specific panel for a specific function,
  to reduce production costs, to save money for customers,
  to reduce kennel-assembling time, and to provide ease of use),
  Can be coupled with other panels at any angle,
  Can be used as an inner or outer panel
  (i.e., dividing-wall panel for multiple kennels in one, dividing-floor panel for multiple levels, ramp panel, or perch panel),
 b) Has unique offset couplers, which can offsettingly couple together the tube ends of the roof panels, truss panels, wall panels, floor panels, door panels, ramp panels, perch panels, and storage panel,
 c) Has unique centering, aligning, and coupling couplers, which can center, align, and couple all the roof panels, truss panels, wall panels, floor panels, door panels, ramp panels, perch panels, and storage panel,
 d) Can be quickly and easily assembled and disassembled by hand, (eliminating the need for using any tools),
 e) Prevents all the panels from twisting, bending, and collapsing when pushed, for example, by pets,
 f) Saves materials, saves labor, saves time, and saves money,
 g) Provides reliability and convenience, and
 h) Prolongs the service lifespan of the unique indoor-outdoor kennel
 (by using single-shaft-clamp-couplers, double-shaft-clamp-couplers, double-shaft-couplers, and double-clamp-couplers, all of which can quickly and easily couple and decouple the roof panels, truss panels, wall panels, floor panels, door panels, ramp panels, and perch panels of the unique indoor-outdoor kennel, to allow all the panels to be quickly and easily assembled and disassembled (without using any tools).

2) It is another object of the present invention to provide the unique reconfigurable expandable shrinkable quick-assembly quick-disassembly indoor-outdoor kennel, which:
 a) Has unique coupler, which can perform the following four functions, at the same time:
  Sealing the sharp edges of the tube ends of its roof panels, truss panels, wall panels, floor panels, door panels, ramp panels, perch panels, and storage panels,
  Preventing its roof panels, truss panels, wall panels, floor panels, door panels, ramp panels, perch panels, and storage panels from twisting, bending, and warping,
  Preventing its roof panels, truss panels, wall panels, floor panels, door panels, ramp panels, perch panels, and storage panels from sliding, spreading apart, and
  Coupling its roof panels, truss panels, wall panels, floor panels, door panels, ramp panels, perch panels, and storage panels,
 b) Eliminates a lot of injuries, the needs for tetanus shots, and medical expenses,
 c) Prevents the unique indoor-outdoor kennel from collapsing,
 d) Retains its intended shape, and
 e) Prolongs the service lifespan of the unique indoor-outdoor kennel
 (by using square single-shaft-clamp-couplers, square double-shaft-clamp-couplers, square double-shaft-couplers, and square double-clamp-couplers, all of which are inserted into the tube ends of the roof panels, truss panels, wall panels, floor panels, door panels, ramp panels, and perch panels of the unique indoor-outdoor kennel, to seal the tube ends, to cover the sharp edges of the tube ends, and to prevent all the panels from twisting, bending, and collapsing when pushed, for example, by animals).

3) It is a further object of the present invention to provide the unique reconfigurable expandable shrinkable quick-assembly quick-disassembly indoor-outdoor kennel, which:
 a) Prevents its couplers from rusting,
 b) Prevents its couplers from accidentally cutting pets,
 c) Eliminates a lot of injuries, and
 d) Eliminates the needs for tetanus shots and medical expenses
 (by using single-shaft-clamp-couplers, double-shaft-clamp-couplers, double-shaft-couplers, and double-clamp-couplers, all of which are made of plastic with rounded edges and corners, to prevent them from rusting and cutting animals).

4) It is an even further object of the present invention to provide the unique reconfigurable expandable shrinkable quick-assembly quick-disassembly indoor-outdoor kennel, which can be quickly and easily configured to have a wide variety of shapes and sizes. For example, the unique indoor-outdoor kennel can be assembled to have:
 a) Alphanumeric or geometric shapes and sizes,
 b) Man-made or nature-made shapes and sizes, c) Multiple roof, truss, wall, floor, ramp, or perch levels, and
d) Multiple inner and outer roofs, trusses, walls, floors, doors, ramps, perches, and storages
(by using single-shaft-clamp-couplers, double-shaft-clamp-couplers, double-shaft-couplers, and double-clamp-couplers, all of which can couple the roof panels, truss panels, wall panels, floor panels, door panels, ramp panels, and perch panels of the unique indoor-outdoor kennel at any angles (for example, acute, right, obtuse, straight, reflex, or full angles).

5) It is another object of the present invention to provide the unique reconfigurable expandable shrinkable quick-assembly quick-disassembly indoor-outdoor kennel, which:
  a) Eliminates all holes to be drilled into all the panels,
  b) Eliminates all protrusions to be welded or otherwise attached to all the panels, and
  c) Eliminates all additional apparatus to be welded or otherwise attached or built into all the panels
(by using single-shaft-clamp-couplers, double-shaft-clamp-couplers, double-shaft-couplers, and double-clamp-couplers, all of which can quickly and easily be snapped on and snapped off the roof panels, truss panels, wall panels, floor panels, door panels, ramp panels, and perch panels of the unique indoor-outdoor kennel, to quickly and easily assemble and disassemble the unique indoor-outdoor kennel).

6) It is yet another object of the present invention to provide the unique reconfigurable expandable shrinkable quick-assembly quick-disassembly indoor-outdoor kennel, which:
  a) Can be quickly and easily assembled and disassembled (by hand),
  b) Can be quickly and easily stored in a car trunk and transported (i.e., to a park or a beach),
  c) Can be used inside (i.e., inside a house) and outside (i.e., outside a house), and
  d) Can provide convenience, ease of use, and save time
(by using single-shaft-clamp-couplers, double-shaft-clamp-couplers, double-shaft-couplers, and double-clamp-couplers, all of which can quickly and easily couple and decouple the roof panels, truss panels, wall panels, floor panels, door panels, ramp panels, and perch panels of the unique indoor-outdoor kennel (without using any tools).

7) It is still yet another object of the present invention to provide the unique reconfigurable expandable shrinkable quick-assembly quick-disassembly indoor-outdoor kennel, which:
  a) Can be configured to have at least one concave roof, to perform triple functions of:
    Functioning as a storage to store foods, toys, leash, accessories thereon,
    Functioning as a terrace, and
    Functioning as a roof,
  b) Can be configured to have at least one flat roof to perform triple functions of:
    Functioning as a perch,
    Functioning as a terrace, and
    Functioning as a roof,
  c) Can be configured to have at least one convex roof, to perform triple functions of:
    Functioning as a ramp,
    Functioning as a terrace, and
    Functioning as a roof,
  d) Can be configured to have at least one set of upper and lower floors:
    To let pet feces fall through the upper floor and stay on the lower floors, and
    To keep pets stay on the upper floor away from their feces.
  e) Can be configured to have at least one inside or outside ramp and/or perch
(by using single-shaft-clamp-couplers, double-shaft-clamp-couplers, double-shaft-couplers, and double-clamp-couplers, all of which can couple the roof panels of the unique indoor-outdoor kennel in any angles).

8) It is still yet an even further object of the present invention to provide the unique reconfigurable expandable shrinkable quick-assembly quick-disassembly indoor-outdoor kennel, which can perform five following different functions. It:
  a) Can be used as an enclosed kennel,
  b) Can be used as a pet run,
  c) Can be used as a pet-training pen,
  d) Can be used as a pet-transporting crate, and
  e) Can be used as a pet cage
(by using single-shaft-clamp-couplers, double-shaft-clamp-couplers, double-shaft-couplers, and double-clamp-couplers, all of which can quickly and easily couple and decouple the roof panels, truss panels, wall panels, floor panels, door panels, ramp panels, and perch panels of the unique indoor-outdoor kennel (without using any tools).

9) It is still yet an even further object of the present invention to provide the unique reconfigurable expandable shrinkable quick-assembly quick-disassembly indoor-outdoor kennel, which:
  a) Is scalable to be small (i.e., for birds or mice), and
  b) Is scalable to be large (i.e., for chickens or large breed dogs)
(by using single-shaft-clamp-couplers, double-shaft-clamp-couplers, double-shaft-couplers, and double-clamp-couplers, all of which can quickly and easily couple and decouple the roof panels, truss panels, wall panels, floor panels, door panels, ramp panels, and perch panels of the unique indoor-outdoor kennel (without using any tools).

Other objects and advantages of the present invention will become apparent from a consideration of the accompanying drawings and ensuing description.

BRIEF DESCRIPTION OF THE DRAWINGS

FIGS. 1A, 1B, 1C, 1D, 1E, and 1F illustrate perspective and side views of a multi-positional multi-directional anti-twisting anti-bending self-locking self-centering single-shaft-clamp-coupler.

FIGS. 2A, 2B, 2C, 2D, and 2E illustrate perspective and side views of a multi-positional multi-directional anti-twisting anti-bending self-locking self-centering double-shaft-clamp-coupler.

FIGS. 3A, 3B, 3C, 3D, 3E, and 3F illustrate perspective and side views of a multi-positional multi-directional anti-twisting anti-bending self-locking self-centering double-shaft-coupler.

FIGS. 4A, 4B, 4C, 4D, 4E, and 4F illustrate perspective and side views of a multi-positional multi-directional anti-twisting anti-bending self-locking self-centering double-clamp-coupler.

FIGS. 5, 6A, 6B, 7, and 8 illustrate perspective and side views of modular roof panels, modular truss panels, modular wall panels, modular floor panels, detachable doorframe, and detachable door.

FIGS. 11, 12, 13, 14A, 14B, and 14C illustrate side, front, and top views of the stackable, interchangeable, expandable, and shrinkable modular roof panels, modular truss panels, modular wall panels, modular floor panels, detachable doorframe, and detachable door.

SUMMARY OF THE INVENTION

Figure 2A:
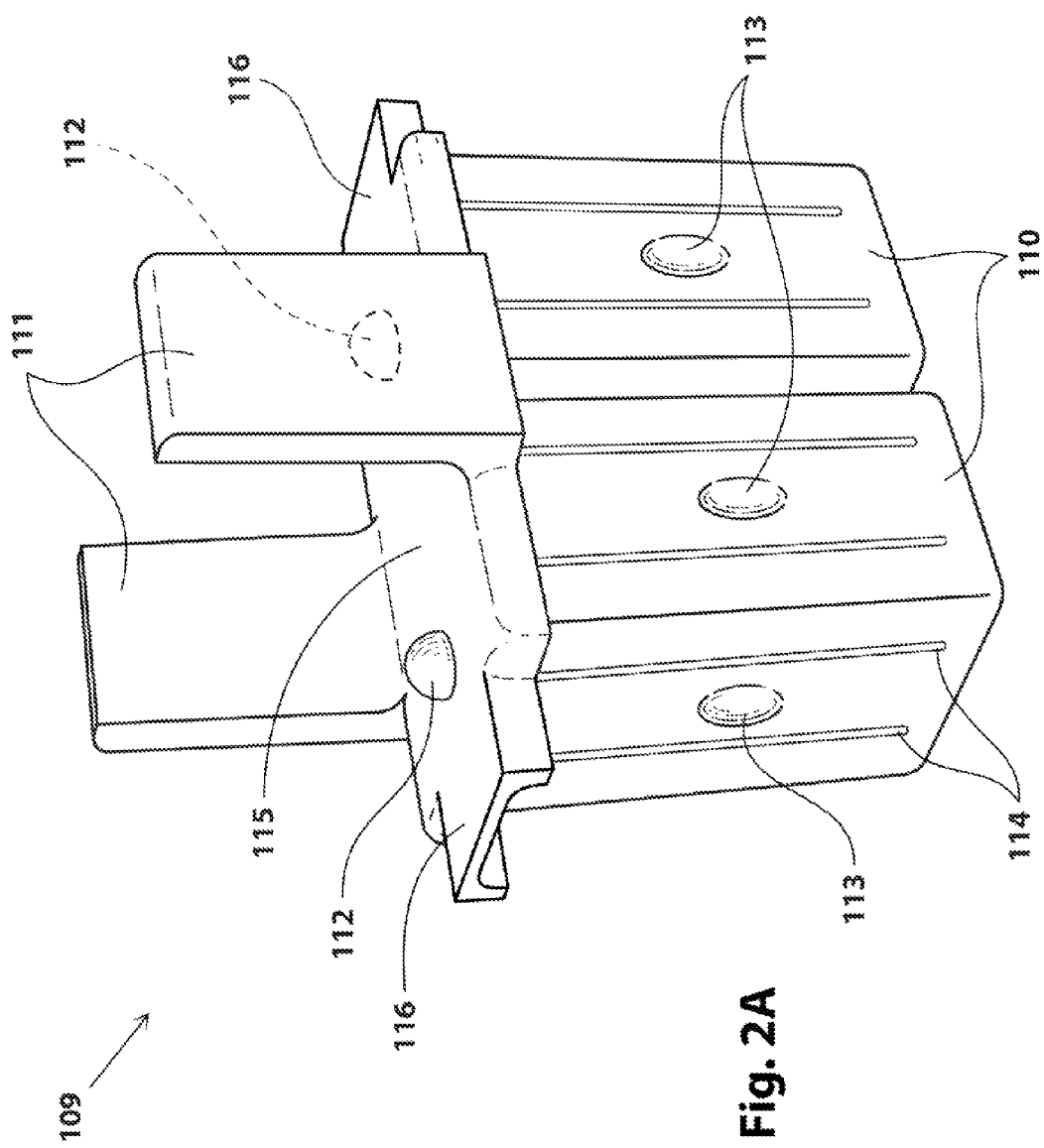
Figure 2E:
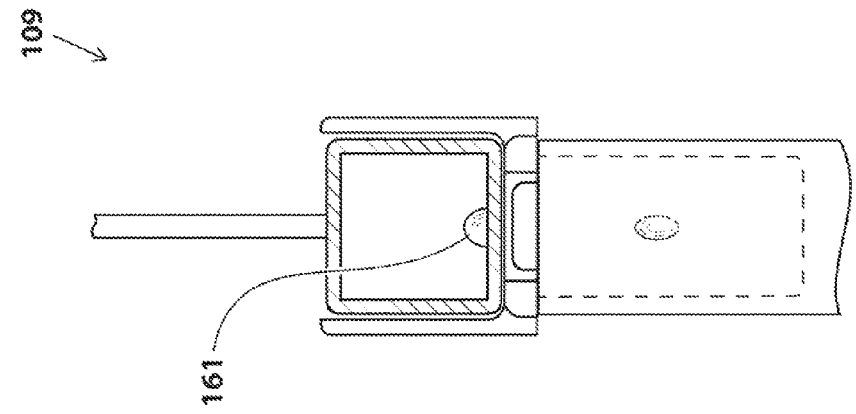
Figure 2D:
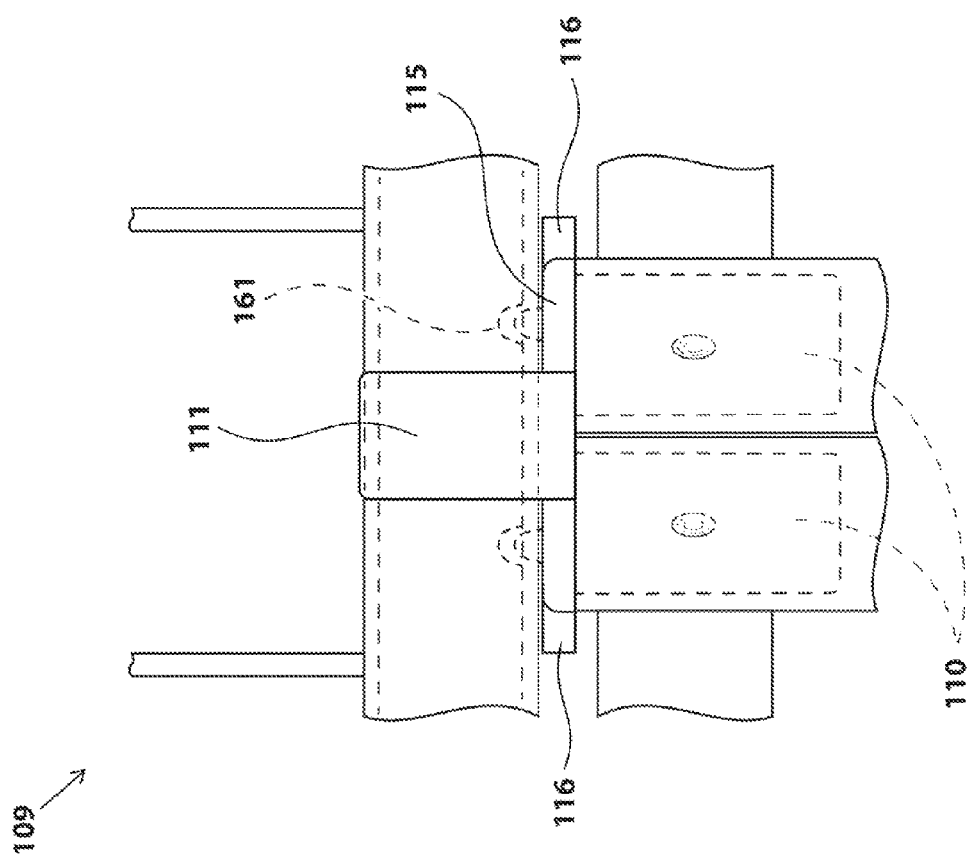
Figure 3A:
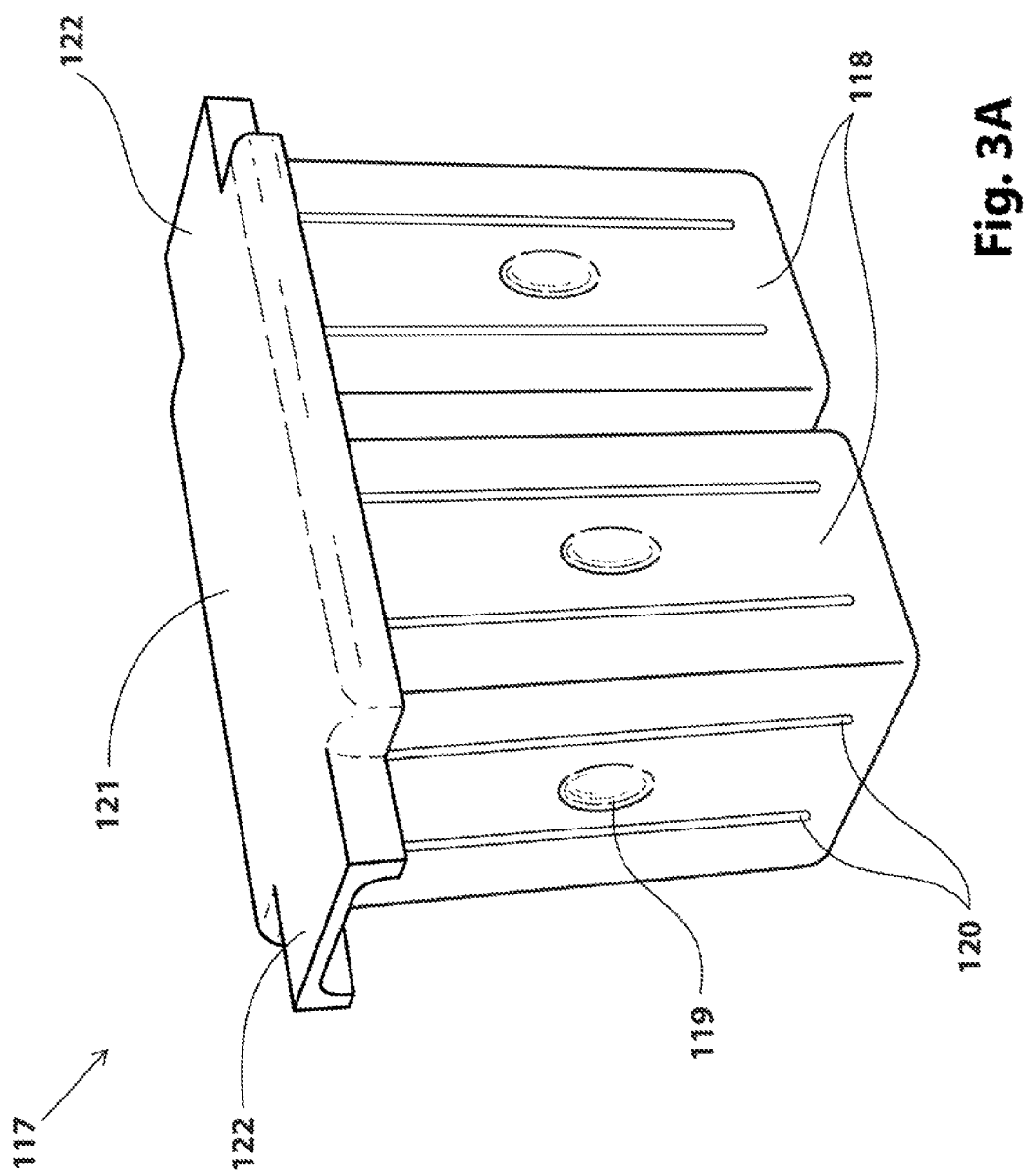
Figure 3F:
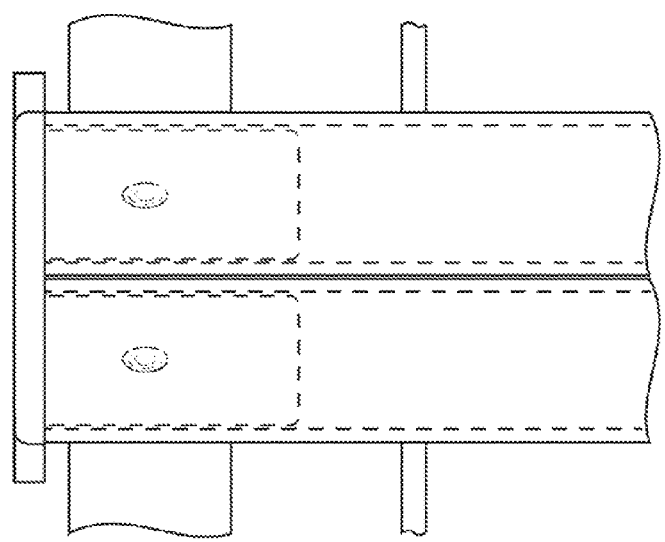
Figure 3E:
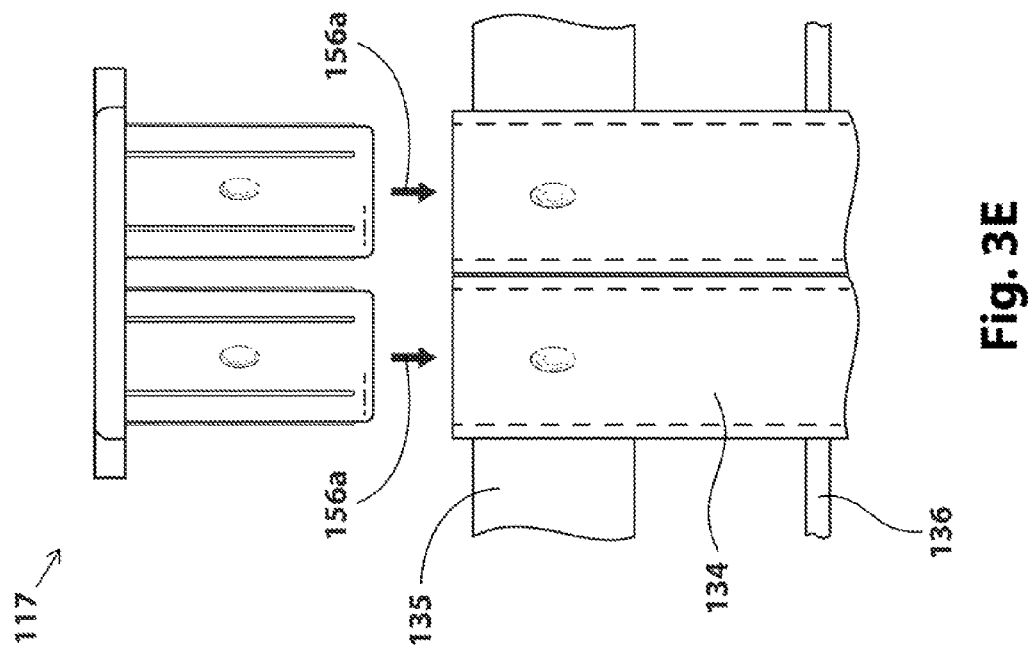
Figure 4B:
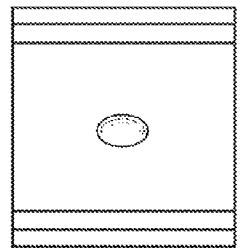
Figure 4C:
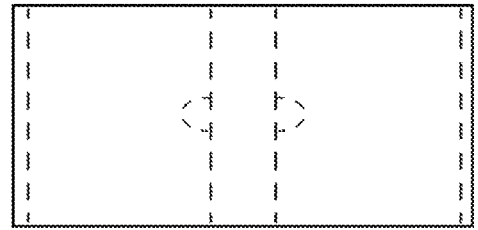
Figure 4A:
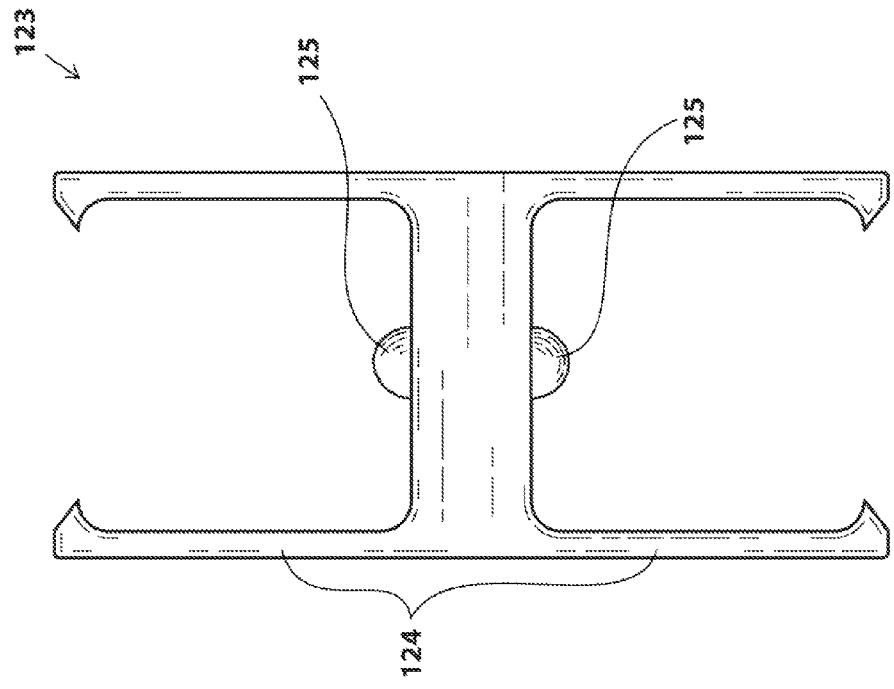

A unique reconfigurable expandable shrinkable quick-assembly quick-disassembly indoor-outdoor kennel for multiple types of animals comprises stackable, interchangeable, expandable, and shrinkable panels, doorframe panel, door panel, single-shaft-clamp-couplers, double-shaft-clamp-couplers, double-shaft-couplers, and double-clamp-couplers. Each of the panels can be used either as a roof panel, a truss panel, a wall panel, a floor panel, a ramp panel, a perch panel, or a storage panel. Each of the couplers is for centering, aligning, coupling, and locking inside the tube ends of at least two panels, to prevent the panels from twisting, bending, and collapsing. The unique indoor-outdoor kennel can be quickly and easily assembled and disassembled by hand, without using any tools, can be easily stored in a car trunk and transported to a park or beach, can be easily configured to form a single-or-multi-level kennel of a large variety of shapes and sizes, and can have at least one convex, flat, or concave roof, which can also function as a storage to store food bags, bowl, toys, pet pad, accessories, leash, etc. for multiple types of pets.

DETAILED DESCRIPTION OF THE INVENTION

Component

Referring to FIGS. 1A-10 (thirty figures), the unique reconfigurable quick-assembly quick-disassembly indoor and outdoor kennel, for multiple animal types, having multi-positional, multi-directional, stackable, interchangeable, expandable, and shrinkable modular roof system, modular truss system, modular wall system, and modular floor system for multiple types of animals, comprises:

1) A plurality of multi-positional multi-directional anti-twisting anti-bending self-locking self-centering single-shaft-clamp-couplers 101, each comprising (FIGS. 1A-1F):
2) A multi-positional multi-directional anti-twisting anti-bending self-locking single shaft 102,
3) A multi-positional multi-directional anti-twisting anti-bending self-locking offset clamp 103,
4) A self-locking self-centering nipple 104,
5) Self-locking self-centering recesses 105,
6) Self-locking self-centering ribs 106,
7) An anti-rust single cap 107,
8) A disassembling single lever 108;
9) A plurality of multi-positional multi-directional anti-twisting anti-bending self-locking self-centering double-shaft-clamp-couplers 109, each comprising (FIGS. 2A-2E):
10) Multi-positional multi-directional anti-twisting anti-bending self-locking double shafts 110,
11) A multi-positional multi-directional anti-twisting anti-bending self-locking central clamp 111,
12) Self-locking self-centering nipples 112,
13) Self-locking self-centering recesses 113,
14) Self-locking self-centering ribs 114,
15) Anti-rust double caps 115,
16) Disassembling double levers 116;
17) A plurality of multi-positional multi-directional anti-twisting anti-bending self-locking self-centering double-shaft-couplers 117, each comprising (FIGS. 3A-3F):
18) Multi-positional multi-directional anti-twisting anti-bending self-locking double shafts 118,
19) Self-locking self-centering recesses 119,
20) Self-locking self-centering ribs 120,
21) Anti-rust double caps 121,
22) Disassembling double levers 122;
23) A plurality of multi-positional multi-directional anti-twisting anti-bending self-locking self-centering double-clamp-couplers 123, each comprising (FIGS. 4A-4F):
24) Multi-positional multi-directional anti-twisting anti-bending self-locking double clamps 124,
25) Self-locking self-centering nipples 125;
26) A plurality of modular roof panels 126, each comprising (FIG. 5):
27) Two modular-roof-panel long tubes 127,
28) Two modular-roof-panel short tubes 128,
29) A modular-roof-panel mesh 129;
30) A plurality of modular truss panels 130, each comprising (FIG. 5):
31) Three modular-truss-panel tubes 131,
32) A modular-truss-panel mesh 132;
33) A plurality of modular wall panels 133, each comprising (FIGS. 6A and 6B):
34) Two modular-wall-panel long tubes 134,
35) Two modular-wall-panel short tubes 135,
36) A modular-wall-panel mesh 136;
37) A plurality of modular floor panels 137, each comprising (FIG. 7):
38) Two modular-floor-panel long tubes 138,
39) Two modular-floor-panel short tubes 139,
40) A modular-floor-panel mesh 140;
41) A detachable doorframe 141, comprising (FIG. 8):
42) Two detachable-doorframe long tubes 142,
43) Two detachable-doorframe short tubes 143,
44) Upper hinge post 144,
45) Lower hinge post 145,
46) Upper latch-receiving hole 146,
47) Lower latch receiving hole 147; and 48) A detachable door 148, comprising (FIGS. 8, 9, and 10):
49) Two detachable-door long tubes 149,
50) Two detachable-door short tubes 150,
51) A detachable-door mesh 151,
52) Upper hinge-post hole 152,
53) Lower hinge-post hole 153,
54) Upper slide latch 154,
55) Lower slide latch 155.

Material

Referring to FIGS. 1A-10 (thirty figures):
1) Multi-positional multi-directional anti-twisting anti-bending self-locking self-centering single-shaft-clamp-couplers 101 each are made of plastic material (FIGS. 1A-1F).
2) Multi-positional multi-directional anti-twisting anti-bending self-locking single shaft 102 is made of plastic material.
3) Multi-positional multi-directional anti-twisting anti-bending self-locking offset clamp 103 is made of plastic material.
4) Self-locking self-centering nipple 104 is made of plastic material.
5) Self-locking self-centering recesses 105 each are made of empty space.
6) Self-locking self-centering ribs 106 each are made of plastic material.
7) Anti-rust single cap 107 is made of plastic material.
8) Disassembling single lever 108 is made of plastic material.
9) Multi-positional multi-directional anti-twisting anti-bending self-locking self-centering double-shaft-clamp-couplers 109 each are made of plastic material (FIGS. 2A-2E).
10) Multi-positional multi-directional anti-twisting anti-bending self-locking double shaft 110 each are made of plastic material.
11) Multi-positional multi-directional anti-twisting anti-bending self-locking central clamp 111 is made of plastic material.
12) Self-locking self-centering nipples 112 each are made of plastic material.
13) Self-locking self-centering recesses 113 each are made of empty space.
14) Self-locking self-centering ribs 114 each are made of plastic material.
15) Anti-rust double caps 115 each are made of plastic material.
16) Disassembling double levers 116 each are made of plastic material.
17) Multi-positional multi-directional anti-twisting anti-bending self-locking self-centering double-shaft-couplers 117 each are made of plastic material (FIGS. 3A-3F).
18) Multi-positional multi-directional anti-twisting anti-bending self-locking double shafts 118 each are made of plastic material.
19) Self-locking self-centering recesses 119 each are made of empty space.
20) Self-locking self-centering ribs 120 each are made of plastic material.
21) Anti-rust double caps 121 each are made of plastic material.
22) Disassembling double levers 122 each are made of plastic material.
23) Multi-positional multi-directional anti-twisting anti-bending self-locking self-centering double-clamp-couplers 123 each are made of plastic material (FIGS. 4A-4F).
24) Multi-positional multi-directional anti-twisting anti-bending self-locking double clamps 124 each are made of plastic material.
25) Self-locking self-centering nipples 125 each are made of plastic material.
26) Modular roof panels 126 each are made of metallic material (FIG. 5).
27) Modular-roof-panel long tubes 127 each are made of metallic material.
28) Modular-roof-panel short tubes 128 each are made of metallic material.
29) Modular-roof-panel mesh 129 is made of metallic material.
30) Modular truss panels 130 each are made of metallic material (FIG. 5).
31) Modular-truss-panel tubes 131 each are made of metallic material.
32) Modular-truss-panel mesh 132 is made of metallic material.
33) Modular wall panels 133 each are made of metallic material (FIGS. 6A and 6B).
34) Modular-wall-panel long tubes 134 each are made of metallic material.
35) Modular-wall-panel short tubes 135 each are made of metallic material.
36) Modular-wall-panel mesh 136 is made of metallic material.
37) Modular floor panels 137 each are made of metallic material (FIG. 7).
38) Modular-floor-panel long tubes 138 each are made of metallic material.
39) Modular-floor-panel short tubes 139 each are made of metallic material.
40) Modular-floor-panel mesh 140 is made of metallic material.
41) Detachable doorframe 141 is made of metallic material (FIG. 8).
42) Detachable-doorframe long tubes 142 each are made of metallic material.
43) Detachable-doorframe short tubes 143 each are made of metallic material.
44) Upper hinge post 144 is made of metallic material.
45) Lower hinge post 145 is made of metallic material.
46) Upper latch-receiving hole 146 is made of empty space.
47) Lower latch receiving hole 147 is made of empty space.
48) Detachable door 148 is made of metallic material (FIGS. 8, 9, and 10).
49) Detachable-door long tubes 149 each are made of metallic material.
50) Detachable-door short tubes 150 each are made of metallic material.
51) Detachable-door mesh 151 is made of metallic material.
52) Upper hinge-post hole 152 is made of empty space.
53) Lower hinge-post hole 153 is made of empty space.
54) Upper slide latch 154 is made of metallic material.
55) Lower slide latch 155 is made of metallic material.

Shape

Referring to FIGS. 1A-10 (thirty figures):
1) Multi-positional multi-directional anti-twisting anti-bending self-locking self-centering single-shaft-clamp-couplers 101 each have a combined shape of its components (FIGS. 1A-1F).
2) Multi-positional multi-directional anti-twisting anti-bending self-locking single shaft 102 has a tube shape and a cross-section of a square ring.
3) Multi-positional multi-directional anti-twisting anti-bending self-locking offset clamp has a letter-U shape.

4) Self-locking self-centering nipple 104 has a nipple shape.
5) Self-locking self-centering recesses 105 each have a dimple shape.
6) Self-locking self-centering ribs 106 each have a ridge shape.
7) Anti-rust single cap 107 has a square shape.
8) Disassembling single lever 108 has a letter-U shape.
9) Multi-positional multi-directional anti-twisting anti-bending self-locking self-centering double-shaft-clamp-couplers 109 each have a combined shape of its components (FIGS. 2A-2E).
10) Multi-positional multi-directional anti-twisting anti-bending self-locking double shafts 110 each have a tube shape and a cross-section of a square ring.
11) Multi-positional multi-directional anti-twisting anti-bending self-locking central clamp 111 has a letter-U shape.
12) Self-locking self-centering nipples 112 each have a nipple shape.
13) Self-locking self-centering recesses 113 each have a dimple shape.
14) Self-locking self-centering ribs 114 each have a ridge shape.
15) Anti-rust double caps 115 each have a square shape.
16) Disassembling double levers 116 each have a letter-U shape.
17) Multi-positional multi-directional anti-twisting anti-bending self-locking self-centering double-shaft-couplers 117 each have a combined shape of its components (FIGS. 3A-3F).
18) Multi-positional multi-directional anti-twisting anti-bending self-locking double shafts 118 each have a tube shape and a cross-section of a square ring.
19) Self-locking self-centering recesses 119 each have a dimple shape.
20) Self-locking self-centering ribs 120 each have a ridge shape.
21) Anti-rust double caps 121 each have a square shape.
22) Disassembling double levers 122 each have a letter-U shape.
23) Multi-positional multi-directional anti-twisting anti-bending self-locking self-centering double-clamp-couplers 123 each have a combined shape of its components (FIGS. 4A-4F).
24) Multi-positional multi-directional anti-twisting anti-bending self-locking double clamps 124 each have a letter-U shape.
25) Self-locking self-centering nipples 125 each have a nipple shape.
26) Modular roof panels 126 each have a rectangular shape (FIG. 5).
27) Modular-roof-panel long tubes 127 each have an elongated shape and a square cross-section.
28) Modular-roof-panel short tubes 128 each have an elongated shape and a square cross-section.
29) Modular-roof-panel meshes 129 each have a rectangular shape.
30) Modular truss panels 130 each have a triangular shape (FIG. 5).
31) Modular-truss-panel tubes 131 each have an elongated shape and a square cross-section.
32) Modular-truss-panel meshes 132 each have a triangular shape.
33) Modular wall panels 133 each have a rectangular shape (FIGS. 6A and 6B).
34) Modular-wall-panel long tubes 134 each have an elongated shape and a square cross-section.
35) Modular-wall-panel short tubes 135 each have an elongated shape and a square cross-section.
36) Modular-wall-panel meshes 136 each have a rectangular shape.
37) Modular floor panels 137 each have a rectangular shape (FIG. 7).
38) Modular-floor-panel long tubes 138 each have an elongated shape and a square cross-section.
39) Modular-floor-panel short tubes 139 each have an elongated shape and a square cross-section.
40) Modular-floor-panel meshes 140 each have a rectangular shape.
41) Detachable doorframe 141 has a rectangular shape (FIG. 8).
42) Detachable-doorframe long tubes 142 each have an elongated shape and a square cross-section.
43) Detachable-doorframe short tubes 143 each have an elongated shape and a square cross-section.
44) Upper hinge post 144 has a cylindrical shape.
45) Lower hinge post 145 has a cylindrical shape.
46) Upper latch-receiving hole 146 has a round shape.
47) Lower latch receiving hole 147 has a round shape.
48) Detachable door 148 has a rectangular shape (FIGS. 8, 9, and 10).
49) Detachable-door long tubes 149 each have an elongated shape and a square cross-section.
50) Detachable-door short tubes 150 each have an elongated shape and a square cross-section.
51) Detachable-door mesh 151 has a rectangular shape.
52) Upper hinge-post hole 152 has a round shape.
53) Lower hinge-post hole 153 has a round shape.
54) Upper slide latch 154 has a rectangular shape.
55) Lower slide latch 155 has a rectangular shape.

Connection

Referring to FIGS. 1A-10 (thirty figures):
1) Multi-positional multi-directional anti-twisting anti-bending self-locking self-centering single-shaft-clamp-couplers 101 each are snap-locked in one modular-wall-panel long tube 127 and each are snap-locked on one modular-truss-panel tube 131 (FIGS. 1A-1F).
2) Multi-positional multi-directional anti-twisting anti-bending self-locking single shaft 102 is molded to anti-rust single cap 107.
3) Multi-positional multi-directional anti-twisting anti-bending self-locking offset clamp 103 is molded to disassembling single lever 108.
4) Self-locking self-centering nipple 104 is molded on multi-positional multi-directional anti-twisting anti-bending self-locking offset clamp 103.
5) Self-locking self-centering recesses 105 each are molded in multi-positional multi-directional anti-twisting anti-bending self-locking single shaft 102.
6) Self-locking self-centering ribs 106 each are molded on multi-positional multi-directional anti-twisting anti-bending self-locking single shaft 102.
7) Anti-rust single cap 107 is molded to multi-positional multi-directional anti-twisting anti-bending self-locking single shaft 102.
8) Disassembling single lever 108 is molded to anti-rust single cap 107.
9) Multi-positional multi-directional anti-twisting anti-bending self-locking self-centering double-shaft-clamp-couplers 109 each are snap-locked in two modular-wall-panel long tubes 134 and each are snap-locked on one modular-truss-panel short tube 131 (FIGS. 2A-2E).

10) Multi-positional multi-directional anti-twisting anti-bending self-locking double shafts 110 each are molded to anti-rust double caps 115.
11) Multi-positional multi-directional anti-twisting anti-bending self-locking central clamp 111 is molded to anti-rust double caps 115.
12) Self-locking self-centering nipples 112 each are molded on anti-rust double caps 115.
13) Self-locking self-centering recesses 113 each are molded in multi-positional multi-directional anti-twisting anti-bending self-locking double shafts 110.
14) Self-locking self-centering ribs 114 each are molded on multi-positional multi-directional anti-twisting anti-bending self-locking double shafts 110.
15) Anti-rust double caps 115 each are molded to multi-positional multi-directional anti-twisting anti-bending self-locking double shafts 110.
16) Disassembling double levers 116 each are molded to the opposite ends of anti-rust double caps 115.
17) Multi-positional multi-directional anti-twisting anti-bending self-locking self-centering double-shaft-couplers 117 each are snap-locked in two modular-wall-panel long tubes 134 or two modular-floor-panel long tubes 138 (FIGS. 3A-3F).
18) Multi-positional multi-directional anti-twisting anti-bending self-locking double shafts 118 each are molded to anti-rust double caps 121.
19) Self-locking self-centering recesses 119 each are molded in multi-positional multi-directional anti-twisting anti-bending self-locking double shafts 118.
20) Self-locking self-centering ribs 120 each are molded on multi-positional multi-directional anti-twisting anti-bending self-locking double shafts 118.
21) Anti-rust double caps 121 each are molded to multi-positional multi-directional anti-twisting anti-bending self-locking double shafts 118.
22) Disassembling double levers 122 each are molded to the opposite ends of anti-rust double caps 121.
23) Multi-positional multi-directional anti-twisting anti-bending self-locking self-centering double-clamp-couplers 123 each are snap-locked on one modular-roof-panel short tube 128, one modular-truss-panel tube 131, one modular-wall-panel short tube 135, or one modular-floor-panel short tube 139 (FIGS. 4A-4F).
24) Multi-positional multi-directional anti-twisting anti-bending self-locking double clamps 124 each are molded to self-locking self-centering nipples 125.
25) Self-locking self-centering nipples 125 each are molded to multi-positional multi-directional anti-twisting anti-bending self-locking double clamps 124.
26) Modular roof panels 126 each are attached to at least one modular truss panel 130 and at least one modular wall panel 133 (FIG. 5).
27) Modular-roof-panel long tubes 127 each are welded to modular-roof-panel short tubes 128 and modular-roof-panel meshes 129.
28) Modular-roof-panel short tubes 128 each are welded to modular-roof-panel long tubes 127.
29) Modular-roof-panel mesh 129 is welded to modular-roof-panel long tubes 127 and modular-roof-panel short tubes 128.
30) Modular truss panels 130 each are attached to at least one modular roof panel 126, at least one modular wall panel 133, or detachable doorframe 141 (FIG. 5).
31) Modular-truss-panel tubes 131 each are welded to other modular-truss-panel tubes 131.
32) Modular-truss-panel mesh 132 is welded to modular-truss-panel tubes 131.
33) Modular wall panels 133 each are attached to at least one modular roof panel 126, at least one modular-truss-panel 130, at least one modular floor panels 137, or detachable doorframe 141 (FIGS. 6A and 6B).
34) Modular-wall-panel long tubes 134 each are welded to modular-wall-panel short tubes 135.
35) Modular-wall-panel short tubes 135 each are welded to modular-wall-panel long tubes 134.
36) Modular-wall-panel mesh 136 is welded to modular-wall-panel long tubes 134 and modular-wall-panel short tubes 135.
37) Modular floor panels 137 each are attached to at least one modular wall panel 133 or detachable doorframe 141 (FIG. 7).
38) Modular-floor-panel long tubes 138 each are welded to modular-floor-panel short tubes 139.
39) Modular-floor-panel short tubes 139 each are welded to modular-floor-panel long tubes 138.
40) Modular-floor-panel mesh 140 is welded to modular-floor-panel long tubes 138 and modular-floor-panel short tubes 139.
41) Detachable doorframe 141 is attached to at least one modular truss panel 130, at least one modular wall panel 133, or at least one modular floor panel 137 (FIG. 8).
42) Detachable-doorframe long tubes 142 each are welded to detachable-doorframe short tubes 143.
43) Detachable-doorframe short tubes 143 each are welded to detachable-doorframe long tubes 142.
44) Upper hinge post 144 is welded to one detachable-doorframe short tube 143.
45) Lower hinge post 145 is welded to one detachable-doorframe short tube 143.
46) Upper latch-receiving hole 146 is drilled into one detachable-doorframe long tube 142.
47) Lower latch receiving hole 147 is drilled into one detachable-doorframe long tube 142.
48) Detachable door 148 is attached to detachable doorframe 141 (FIGS. 8, 9, and 10).
49) Detachable-door long tubes 149 each are welded to detachable-door short tubes 150.
50) Detachable-door short tubes 150 each are welded to detachable-door long tubes 149.
51) Detachable-door mesh 151 is welded to detachable-door long tubes 149 and detachable-door short tubes 150.
52) Upper hinge-post hole 152 is molded into one detachable-door long tube 149.
53) Lower hinge-post hole 153 is molded into one detachable-door long tube 149.
54) Upper slide latch 154 is welded to detachable-door mesh 151.
55) Lower slide latch 155 is welded to detachable-door mesh 151.

Function

Referring to FIGS. 1A-10 (thirty figures):
1) Multi-positional multi-directional anti-twisting anti-bending self-locking self-centering single-shaft-clamp-couplers 101 each are for (FIGS. 1A-1F):
   a) Locking together modular roof panel 126, modular truss panel 130, modular wall panel 133, and/or modular floor panel 137,
   b) Preventing them from twisting,
   c) Preventing them from bending, and
   d) Centering them.
2) Multi-positional multi-directional anti-twisting anti-bending self-locking single shaft 102 is for snap-locking inside a tube of modular roof panel 126, modular truss panel 130, modular wall panel 133, or modular floor panel 137.

3) Multi-positional multi-directional anti-twisting anti-bending self-locking offset clamp 103 is for clamping on a tube of modular roof panel 126, modular truss panel 130, modular wall panel 133, or modular floor panel 137.

4) Self-locking self-centering nipple 104 is for:
   a) Snap-locking into a recess on the outer surface of a tube of modular roof panel 126, modular truss panel 130, modular wall panel 133, or modular floor panel 137, and
   b) Centering modular roof panel 126, modular truss panel 130, modular wall panel 133, or modular floor panel 137.

5) Self-locking self-centering recesses 105 each are for:
   a) Snap-locking onto a nipple on the inner surface of a tube of modular roof panel 126, modular truss panel 130, modular wall panel 133, or modular floor panel 137, and
   b) Centering modular roof panel 126, modular truss panel 130, modular wall panel 133, or modular floor panel 137.

6) Self-locking self-centering ribs 106 each are for:
   a) Snap-locking onto the inner surface of a tube of modular roof panel 126, modular truss panel 130, modular wall panel 133, or modular floor panel 137, and
   b) Centering modular roof panel 126, modular truss panel 130, modular wall panel 133, or modular floor panel 137.

7) Anti-rust single cap 107 is for:
   a) Preventing rain water from entering inside a tube of modular roof panel 126, modular truss panel 130, modular wall panel 133, or modular floor panel 137, and
   b) Preventing rain water from rusting modular roof panel 126, modular truss panel 130, modular wall panel 133, or modular floor panel 137.

8) Disassembling single lever 108 is for pulling on single-shaft-clamp-couplers 101 to disassemble it from modular roof panel 126, modular truss panel 130, modular wall panel 133, or modular floor panel 137.

9) Multi-positional multi-directional anti-twisting anti-bending self-locking self-centering double-shaft-clamp-couplers 109 each are for (FIGS. 2A-2E):
   a) Locking together modular roof panel 126, modular truss panel 130, modular wall panel 133, and/or modular floor panel 137,
   b) Preventing them from twisting,
   c) Preventing them from bending, and
   d) Centering them.

10) Multi-positional multi-directional anti-twisting anti-bending self-locking double shafts 110 each are for functioning similarly to single shaft 102.

11) Multi-positional multi-directional anti-twisting anti-bending self-locking central clamp 111 is for functioning similarly to offset clamp 103.

12) Self-locking self-centering nipples 112 each are for functioning similarly to nipple 104.

13) Self-locking self-centering recesses 113 each are for functioning similarly to recess 105.

14) Self-locking self-centering ribs 114 each are for functioning similarly to rib 106.

15) Anti-rust double caps 115 each are for functioning similarly to single cap 107.

16) Disassembling double levers 116 each are for functioning similarly to single lever 108.

17) Multi-positional multi-directional anti-twisting anti-bending self-locking self-centering double-shaft-couplers 117 each are for (FIGS. 3A-3F):
   a) Locking together modular roof panel 126, modular truss panel 130, modular wall panel 133, and/or modular floor panel 137,
   b) Preventing them from twisting,
   c) Preventing them from bending, and
   d) Centering them.

18) Multi-positional multi-directional anti-twisting anti-bending self-locking double shafts 118 each are for functioning similarly to single shaft 102.

19) Self-locking self-centering recesses 119 each are for functioning similarly to recess 105.

20) Self-locking self-centering ribs 120 each are for functioning similarly to rib 106.

21) Anti-rust double caps 121 each are for functioning similarly to single cap 107.

22) Disassembling double levers 122 each are for functioning similarly to single lever 108.

23) Multi-positional multi-directional anti-twisting anti-bending self-locking self-centering double-clamp-couplers 123 each are for (FIGS. 4A-4F):
   a) Locking together modular roof panel 126, modular truss panel 130, modular wall panel 133, and/or modular floor panel 137,
   b) Preventing them from twisting,
   c) Preventing them from bending, and
   d) Centering them.

24) Multi-positional multi-directional anti-twisting anti-bending self-locking double clamps 124 each are for functioning similarly to offset clamp 103.

25) Self-locking self-centering nipples 125 each are for functioning similarly to nipple 104.

Figure 5:
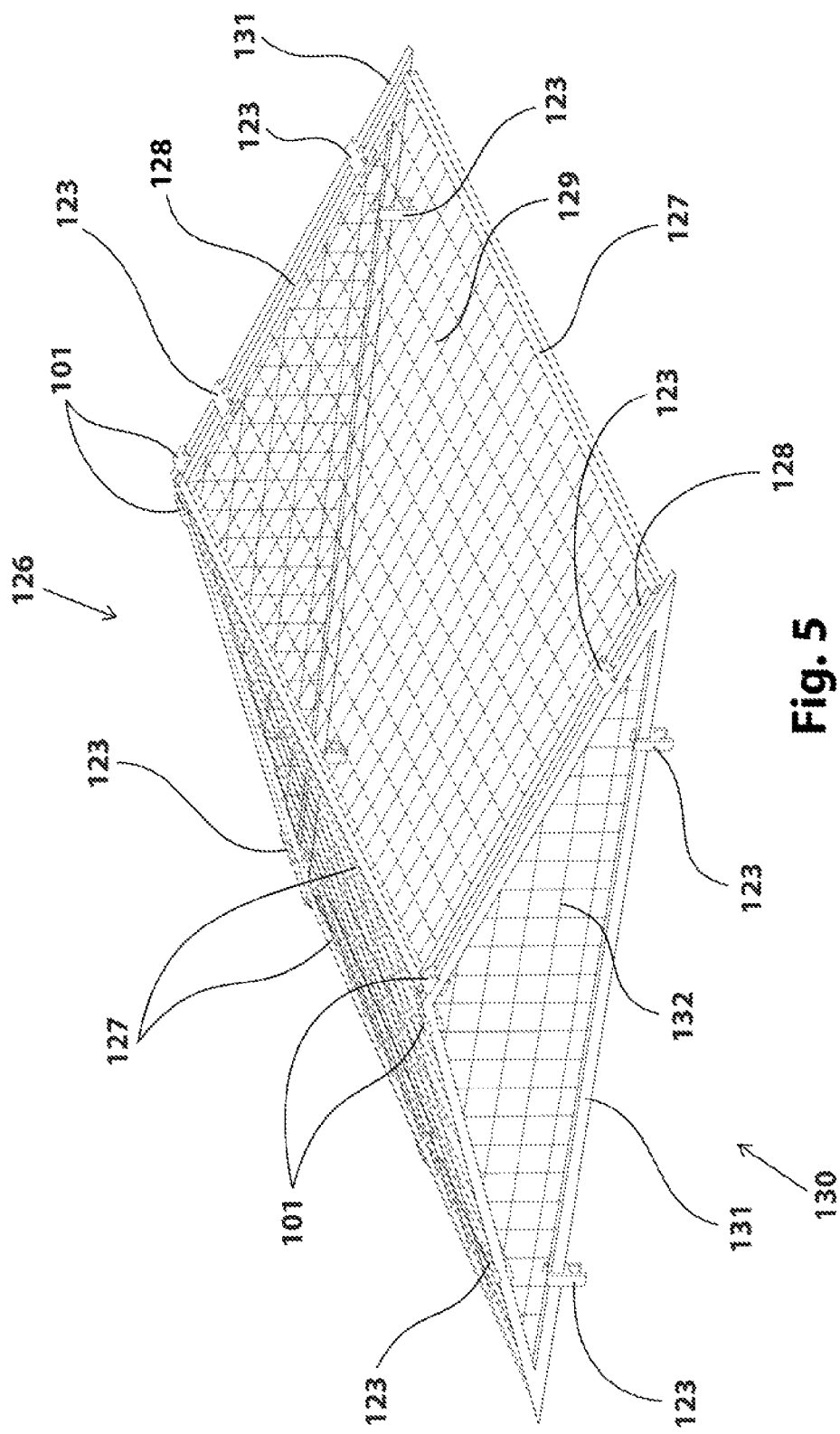

26) Modular roof panels 126 each are for forming part of a roof system (FIG. 5).

27) Modular-roof-panel long tubes 127 each are for making part of a frame.

28) Modular-roof-panel short tubes 128 each are for making part of the frame.

29) Modular-roof-panel mesh 129 is for filling the empty space within the frame.

30) Modular truss panels 130 each are for supporting part of the roof system (FIG. 5).

31) Modular-truss-panel tubes 131 each are for making for making a frame.

32) Modular-truss-panel mesh 132 is for filling the empty space within the frame.

33) Modular wall panels 133 each are for forming part of a wall system (FIGS. 6A and 6B).

34) Modular-wall-panel long tubes 134 each are for making part of a frame.

35) Modular-wall-panel short tubes 135 each are for making part of the frame.

36) Modular-wall-panel mesh 136 is for filling the empty space within the frame.

Figure 7:
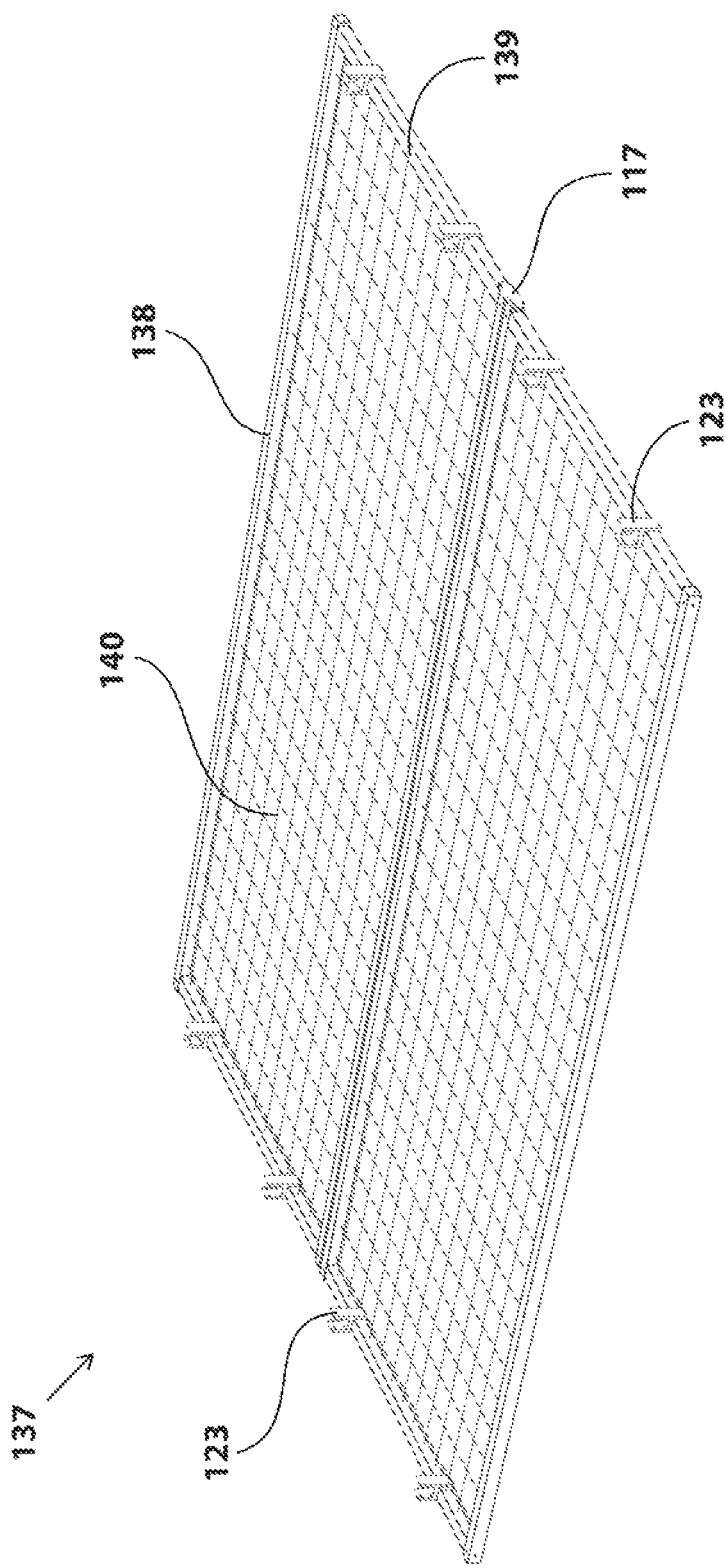

37) Modular floor panels 137 each are for forming part of a floor system (FIG. 7).

38) Modular-floor-panel long tubes 138 each are for making part of a frame.

39) Modular-floor-panel short tubes 139 each are for making part of the frame.

40) Modular-floor-panel mesh 140 is for filling the empty space within the frame.

41) Detachable doorframe 141 is for securing detachable door 148 (FIG. 8).
42) Detachable-doorframe long tubes 142 each are for making part of a frame.
43) Detachable-doorframe short tubes 143 each are for making part of the frame.
44) Upper hinge post 144 is for inserting into upper hinge-post hole 152.
45) Lower hinge post 145 is for inserting into lower hinge-post hole 153.
46) Upper latch-receiving hole 146 is for receiving upper slide latch 154.
47) Lower latch receiving hole 147 is for receiving lower slide latch 155.
48) Detachable door 148 is for providing easy entry and exit (FIGS. 8, 9, and 10).
49) Detachable-door long tubes 149 each are for making part of a frame.
50) Detachable-door short tubes 150 each are for making part of the frame.
51) Detachable-door mesh 151 is for filling the empty space within the frame.
52) Upper hinge-post hole 152 is for receiving upper hinge post 144.
53) Lower hinge-post hole 153 is for receiving lower hinge post 145.
54) Upper slide latch 154 is for sliding into upper latch-receiving hole 146.
55) Lower slide latch 155 is for sliding into upper latch-receiving hole 147.

Operation

Figure 8:
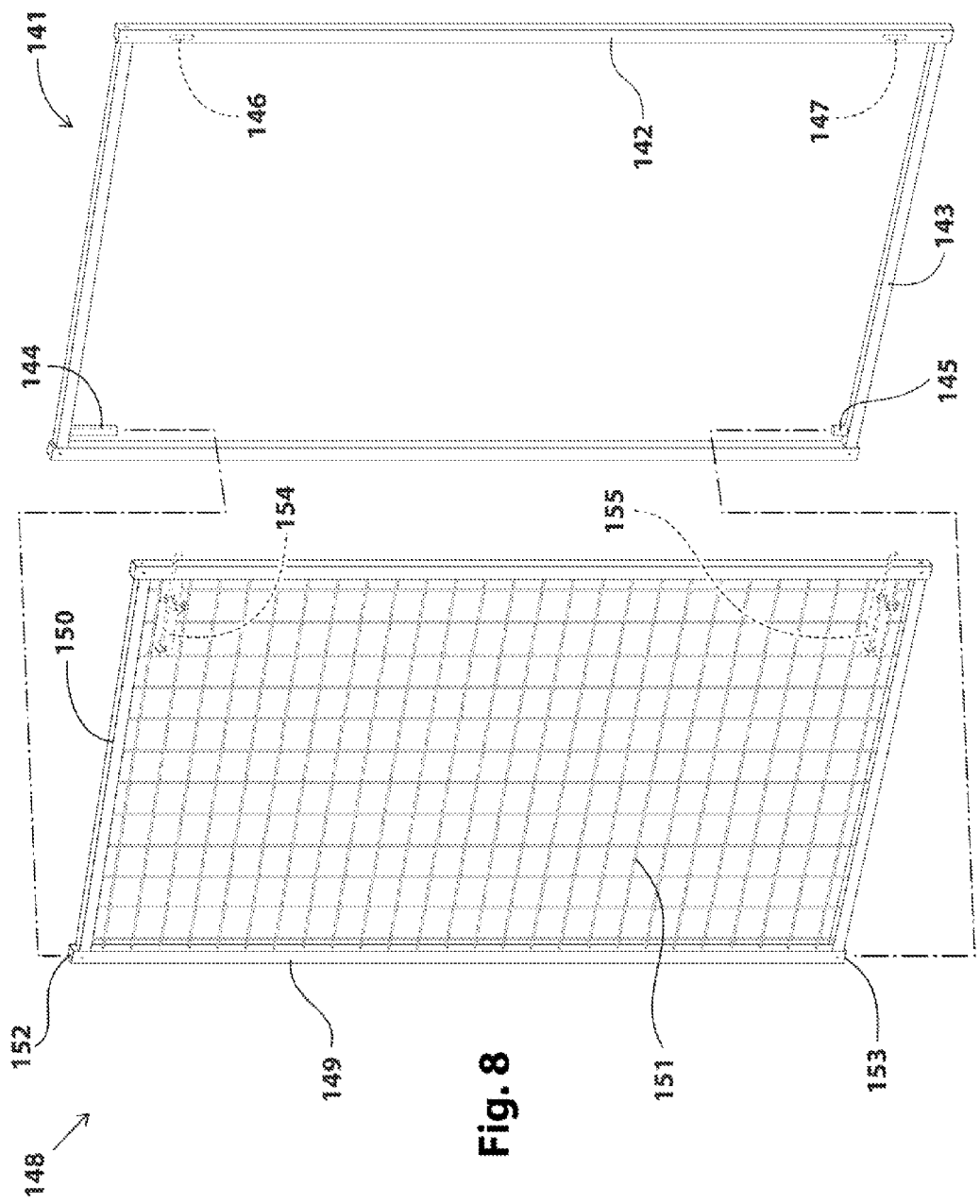
Figure 9:
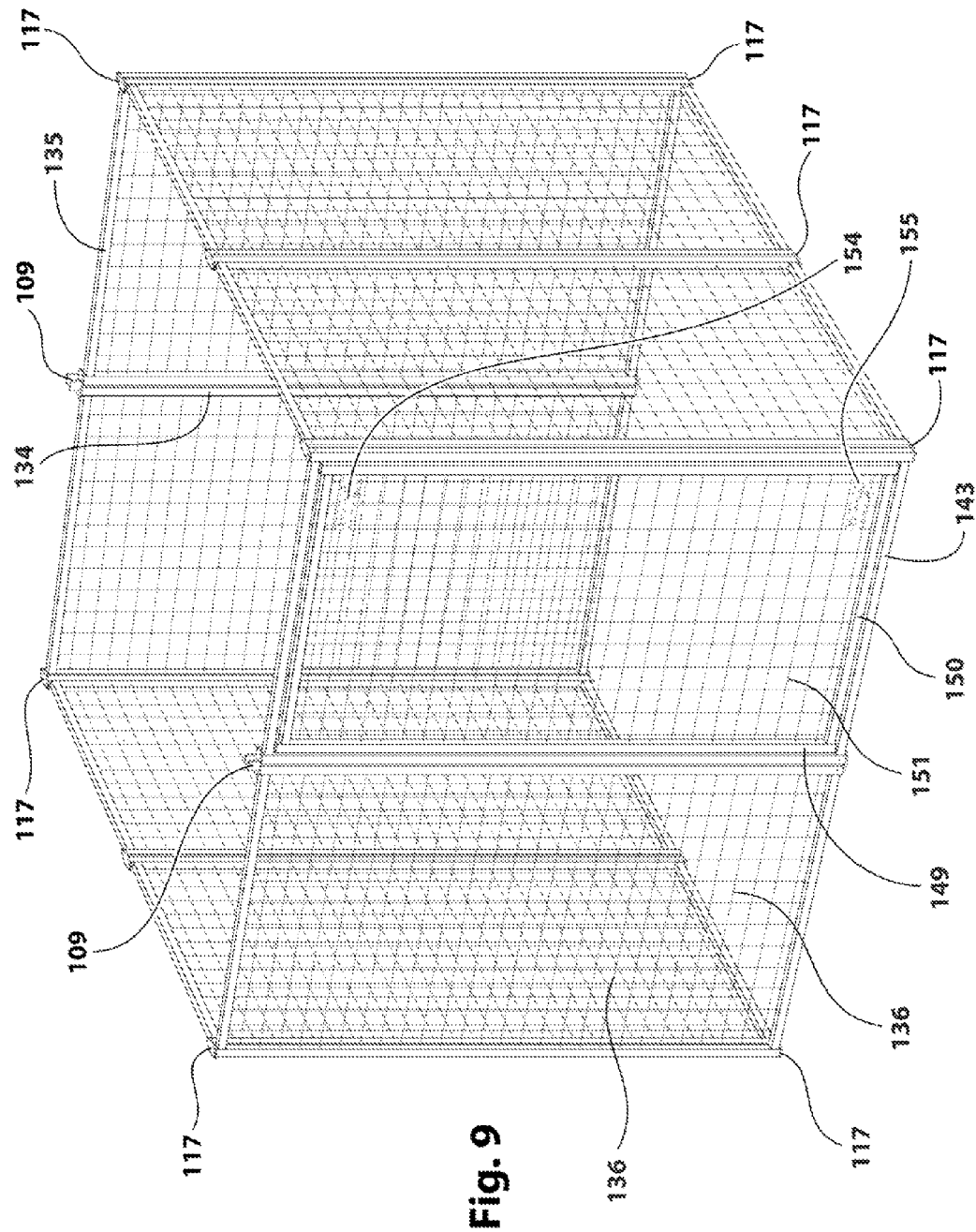
FIGS. 9 and 10 illustrate perspective views of the assembly of modular roof panels, modular truss panels, modular wall panels, modular floor panels, detachable doorframe, and detachable door.
Figure 10:
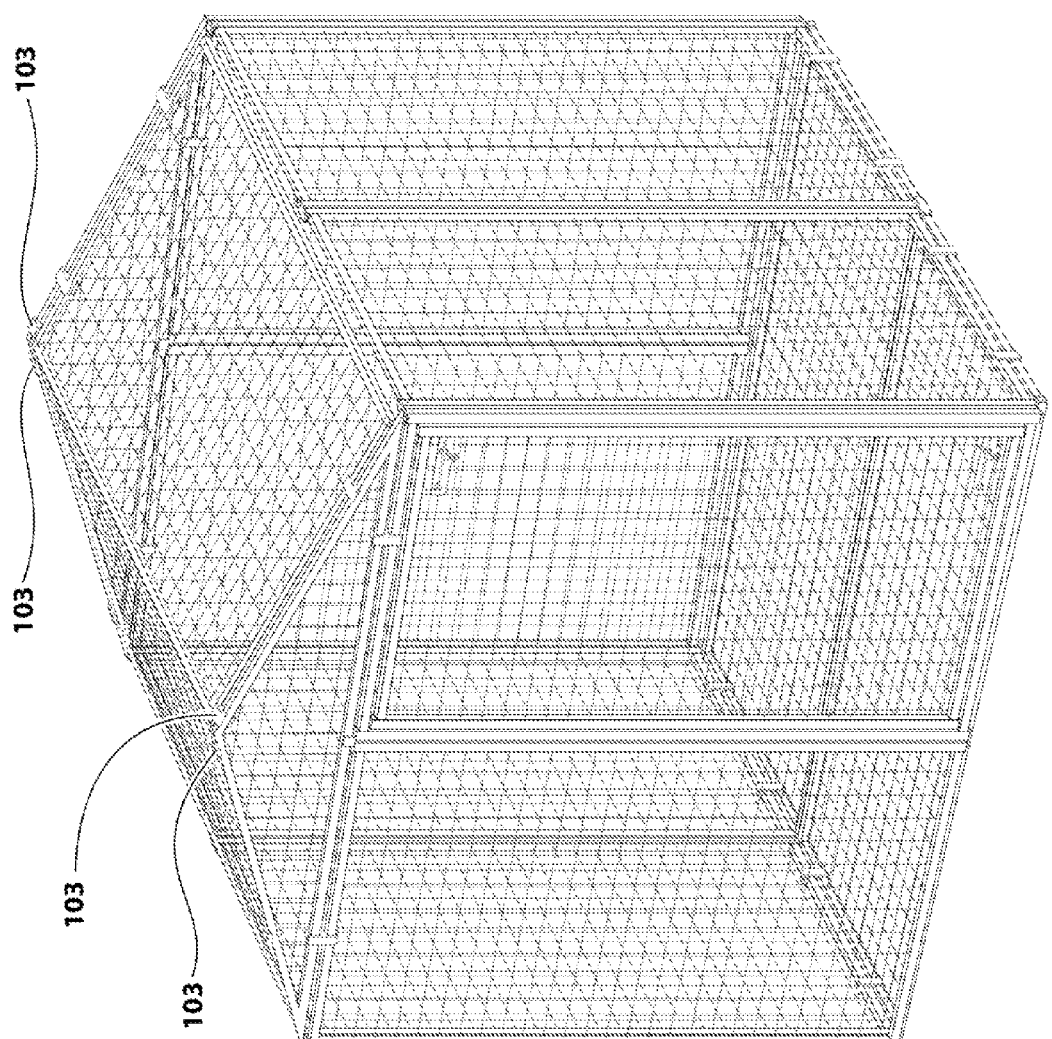

Referring to FIGS. 1A-10 (thirty figures), the operation of the unique reconfigurable quick-assembly quick-disassembly indoor and outdoor kennel, for multiple animal types, having multi-positional, multi-directional, stackable, interchangeable, expandable, and shrinkable modular roof system, modular truss system, modular wall system, and modular floor system for multiple types of animals, comprises:

Roof Assembly (Referring to FIGS. 1A, 1B, 1C, 1D, 1E, 1F, and 5):
1) Inserting anti-twisting anti-bending self-locking single shafts 102 into modular-roof-panel long tubes 127
   such that self-locking self-centering recesses 105 snap-lock onto the nipples on the inner surface of modular-roof-panel long tubes 127;
2) Clamping anti-twisting anti-bending self-locking offset clamps 103 onto modular-truss-panel tubes 131
   such that self-locking self-centering nipples 104 snap-locking into the recesses on the outer surface of modular-truss-panel tubes 131;

Wall Assembly (Referring to FIGS. 3A, 3B, 3C, 3D, 3E, 3F, and 9):
3) Inserting anti-twisting anti-bending self-locking double shaft 118 into modular-wall-panel long tubes 134, in the direction of arrows 156a (FIG. 3E),
   such that self-locking self-centering recesses 119 snap-lock onto the nipples on the inner surface of modular-wall-panel long tubes 134;
4) Inserting anti-twisting anti-bending self-locking double shaft 110 into modular-wall-panel long tubes 134 (Referring to FIGS. 2A, 2B, 2C, 2D, 2E, and 9)
   such that self-locking self-centering recesses 113 snap-lock onto the nipples on the inner surface of modular-wall-panel long tubes 134;

Doorframe-to-Wall Assembly (Referring to FIGS. 8 and 9)

5) Inserting anti-twisting anti-bending self-locking double shaft 118 into detachable-doorframe long tubes 142
   such that self-locking self-centering recesses 119 snap-lock onto the nipples on the inner surface of detachable-doorframe long tubes 142;

Floor Assembly (Referring to FIGS. 4A, 4B, 4C, 4D, 4E, 4F, and 7):
6) Inserting anti-twisting anti-bending self-locking double shaft 118 into modular-floor-panel long tubes 138
   such that self-locking self-centering recesses 119 snap-lock onto the nipples on the inner surface of modular-floor-panel long tubes 138;

Floor-to-Wall Assembly (Referring to FIGS. 7 and 10):
7) Clamping anti-twisting anti-folding self-aligning double clamps 124 onto modular-floor-panel long tubes 138 and modular-floor-panel short tubes 139, in the direction of arrows 156b (FIG. 4F),
   such that self-locking self-centering nipples 125 snap-locking into the recesses on the outer surface of long tubes 138 and short tubes 139;
8) Clamping anti-twisting anti-folding self-aligning double clamps 124 onto modular-wall-panel short tubes 135 and detachable-doorframe short tube 143
   such that self-locking self-centering nipples 125 snap-locking into the recesses on the outer surface of short tubes 135 and short tubes 143;

Wall-to-Roof Assembly (Referring to FIGS. 9 and 10):
9) Clamping anti-twisting anti-bending self-locking central clamp 111 onto modular-roof-panel long tubes 127 and modular-truss-panel tubes 131
   such that self-locking self-centering nipples 112 snap-locking into the recesses on the outer surface of long tubes 127 and tubes 131;
10) Clamping anti-twisting anti-folding self-aligning double clamps 124 onto modular-wall-panel short tubes 135 and detachable-doorframe short tube 143, in the direction of arrows 156b (FIG. 4F),
    such that self-locking self-centering nipples 125 snap-locking into the recesses on the outer surface of short tubes 135 and short tube 143.

Variation

Any component of the unique indoor-outdoor kennel for multiple types of animals can have any shape and size (for example, round, square, rectangular, oval, etc.). The cross-section of any component of the unique indoor-outdoor kennel for multiple types of animals can have any shape and size (for example, round, square, rectangular, oval, etc.).

Referring to FIGS. 11, 12, 13, 14A, 14B, and 14C, any of modular roof panels, modular truss panels, modular wall panels, modular floor panels, detachable doorframe, and detachable door can be stackable, interchangeable, expandable, and shrinkable.

Figure 11:
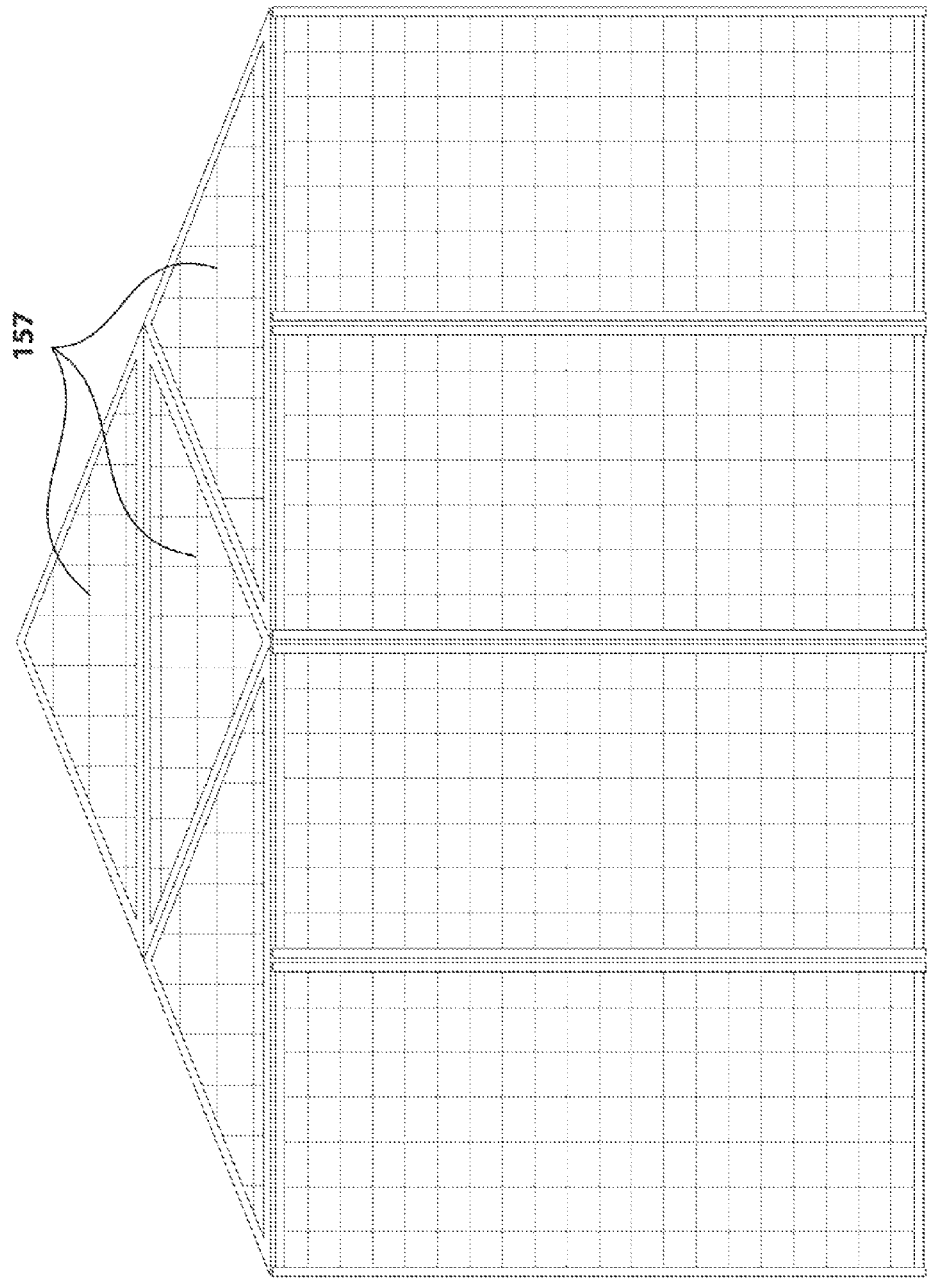

For example, modular truss panels 157, equivalent to modular truss panel 130, are stackable, interchangeable, expandable, and shrinkable (FIG. 11).

Figure 12:
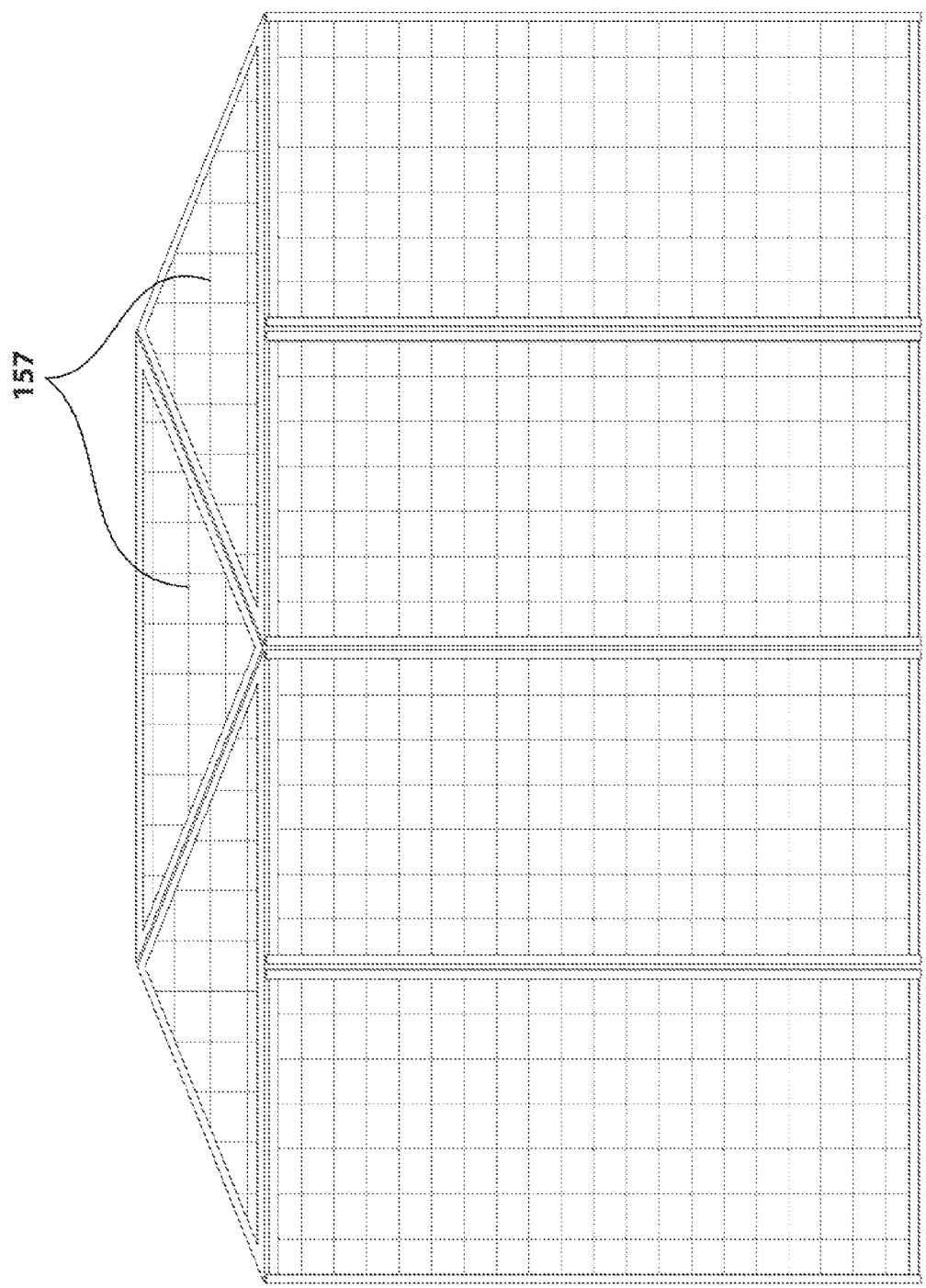

For example, modular truss panels 157, equivalent to modular truss panel 130, are stackable, interchangeable, expandable, and shrinkable (FIGS. 11 and 12).

Figure 13:
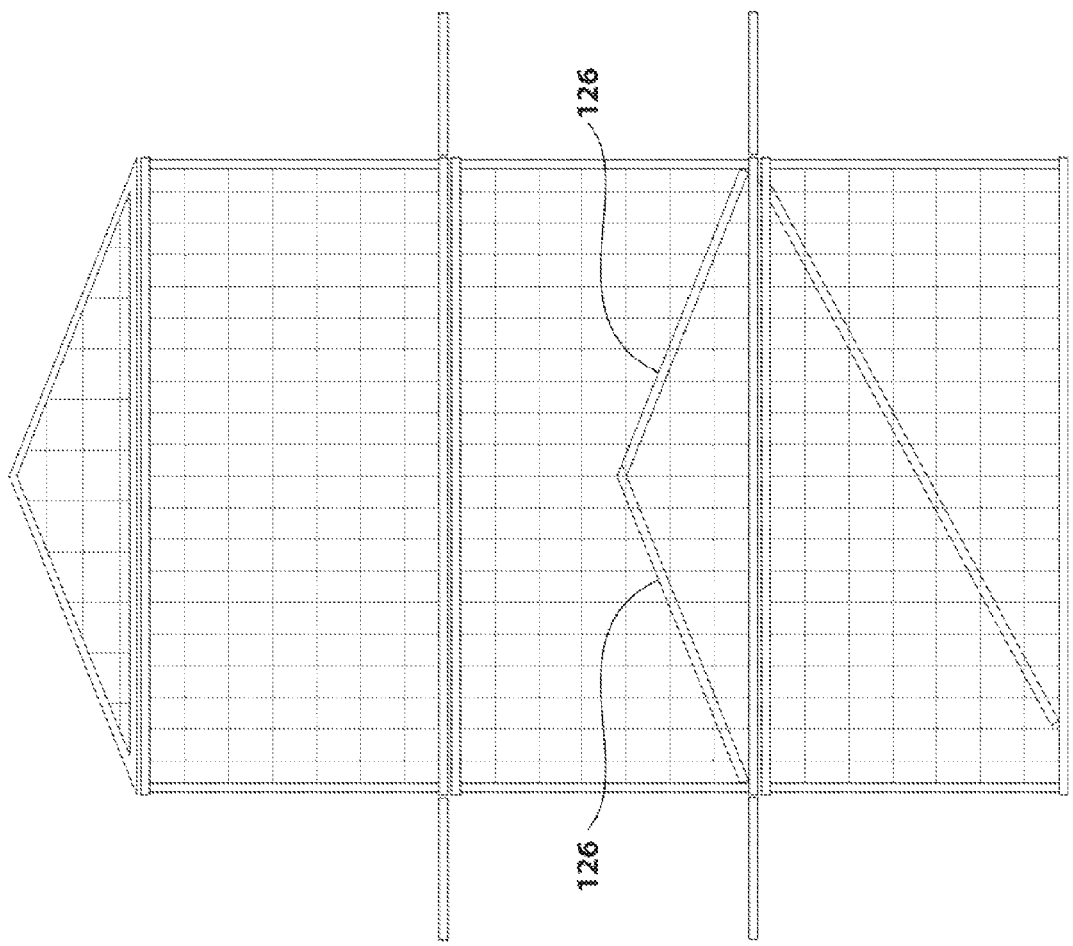

For example, modular roof panels 126 can be used inside the unique indoor-outdoor kennel as a ramp, or as a lifted floor to animals separate from their waste (FIG. 13).

Figure 14A:
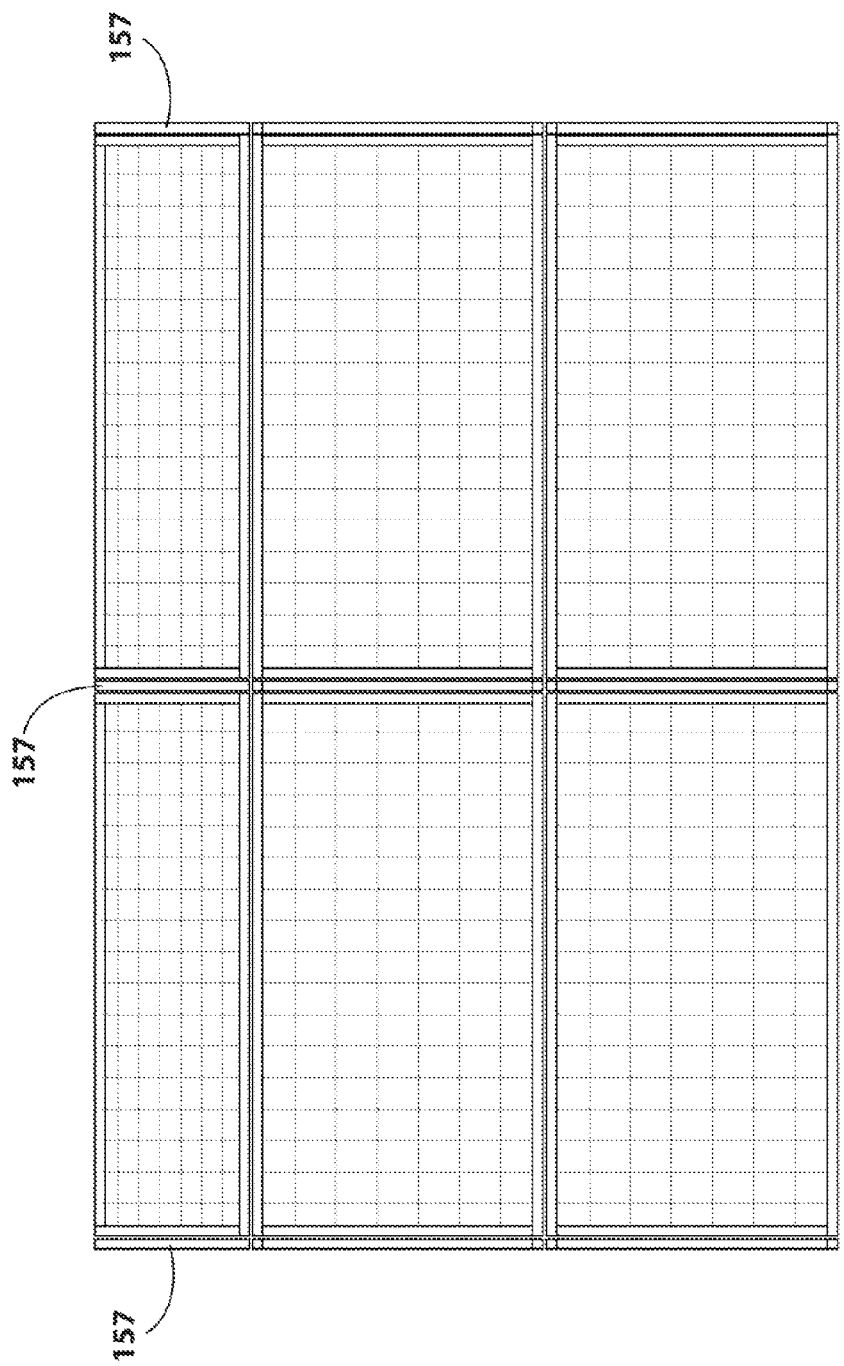

For example, many modular truss panels 157 can be used to expand the roof of the unique indoor-outdoor kennel (FIG. 14A illustrates a left view of the unique expanded two-story double-roof indoor-outdoor kennel).

Figure 14B:
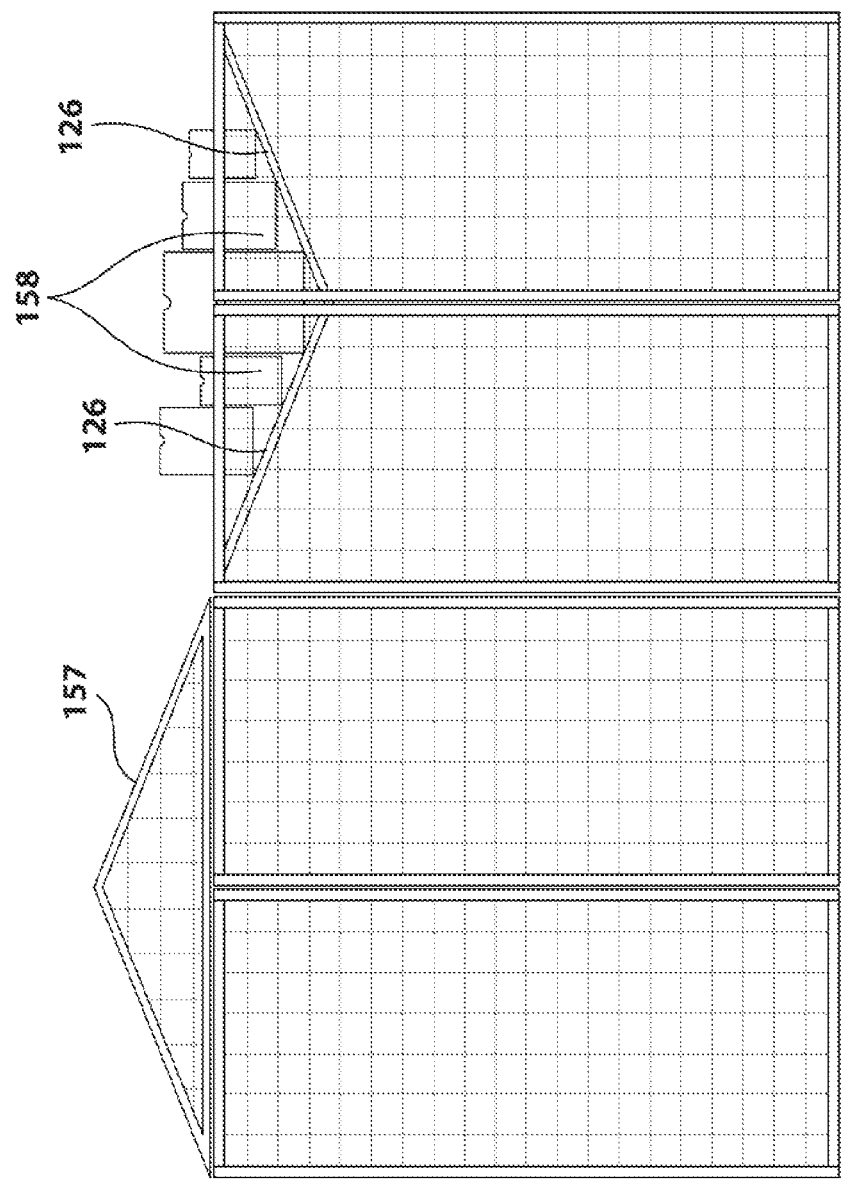

For example, modular roof panels 126 can be used to create a roof or a roof-top storage 158 on top of the unique indoor-outdoor kennel for storing, for example, food bag, water bowl, food bowl, toys, sleeping pad, accessories, leash, tools, etc. for multiple types of animals (FIGS. 14A, 14B, and 14C illustrate left, front, and top views of the unique expanded two-story double-roof indoor-outdoor kennel having roof-top storage 158).

Figure 15:
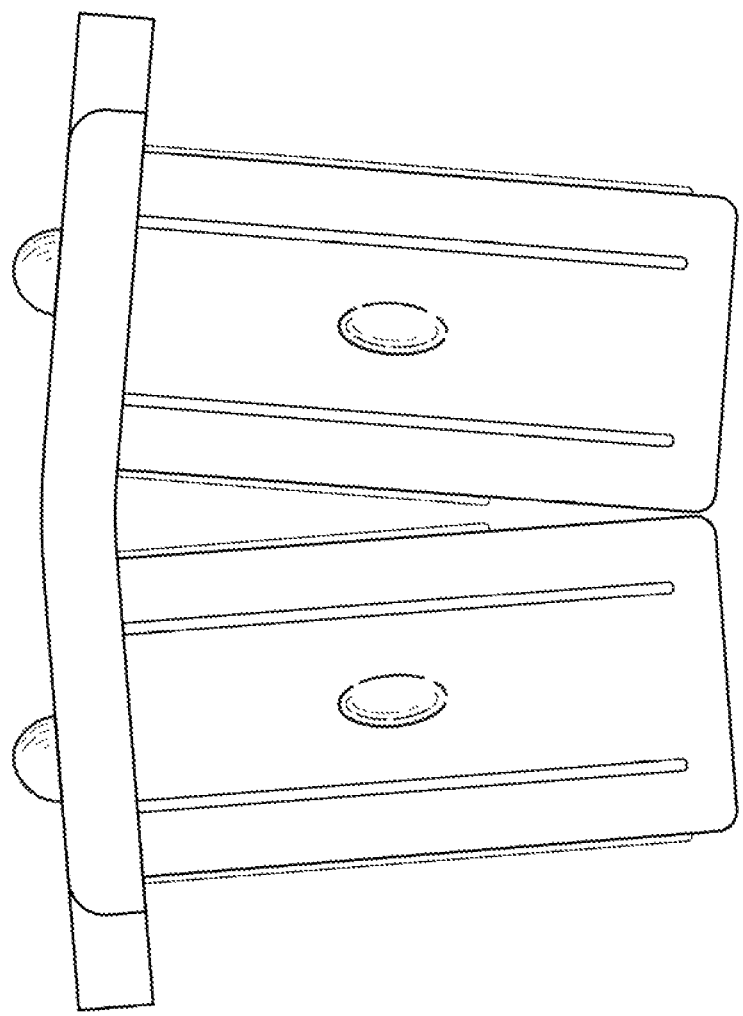
FIGS. 15, 16, 17A, 17B, 18A, and 18B illustrate side, top, and bottom views of variations of the multi-positional multi-directional anti-twisting anti-bending self-locking self-centering double-shaft-coupler.
Figure 16:
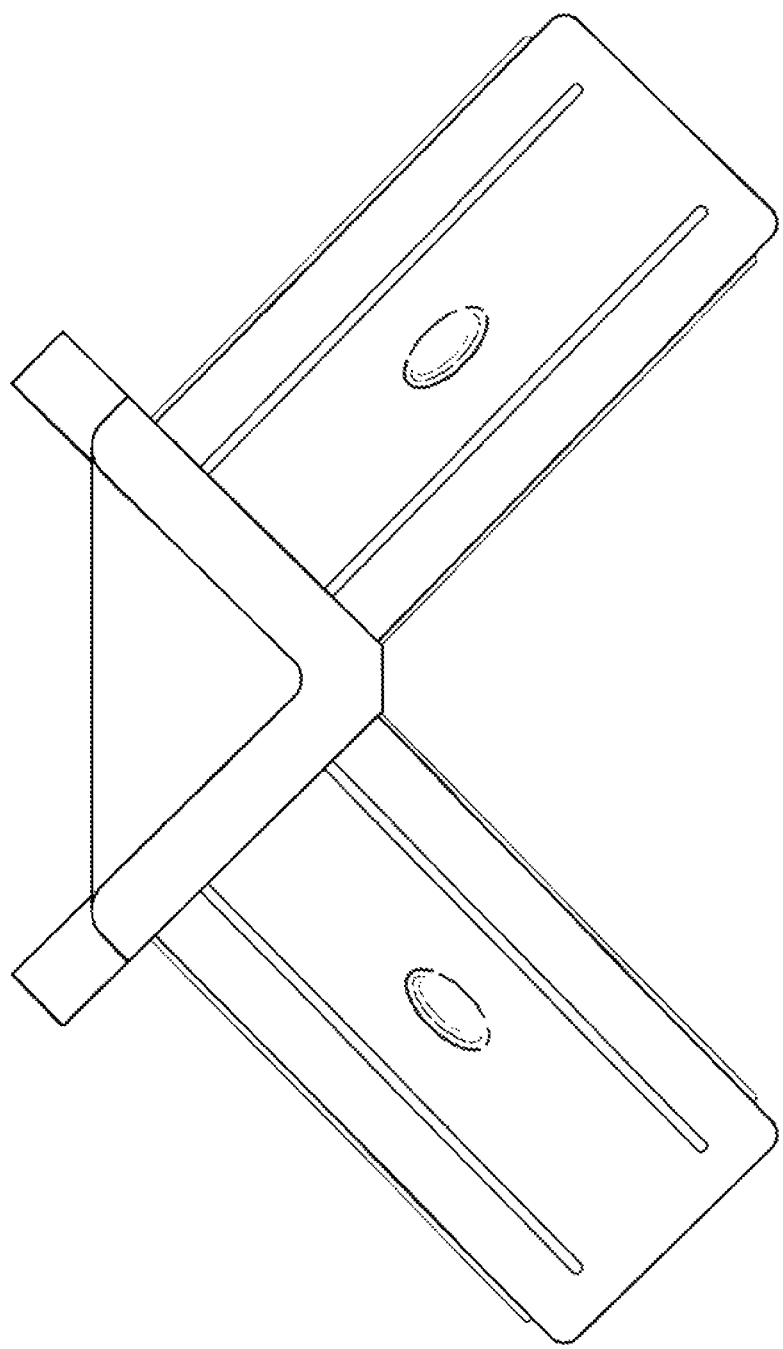
Figure 17B:
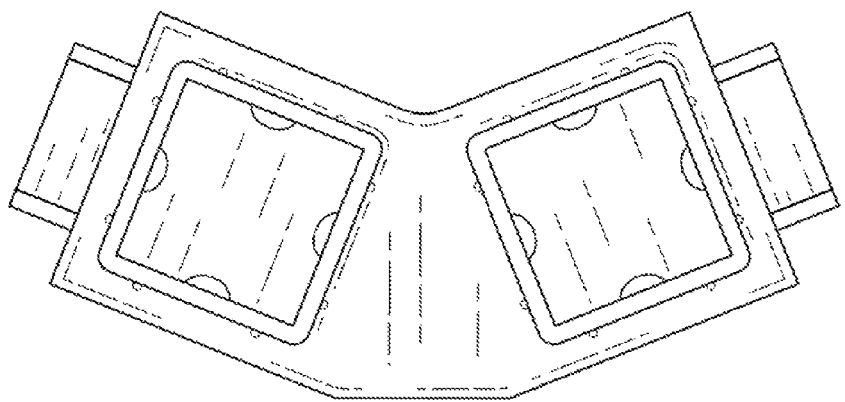
Figure 17A:
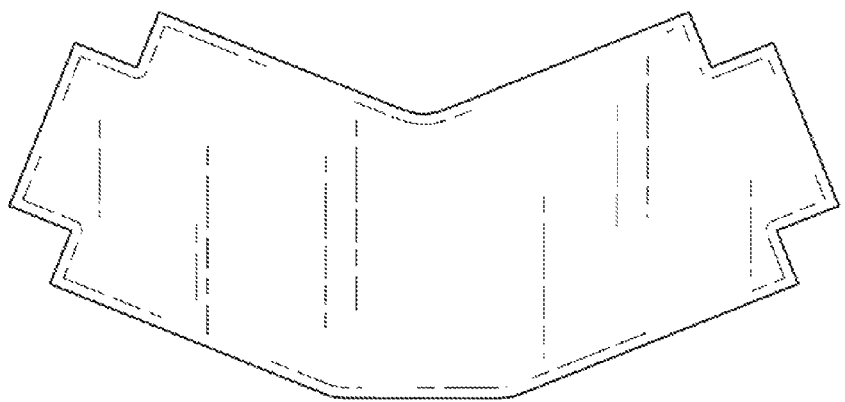
Figure 18B:
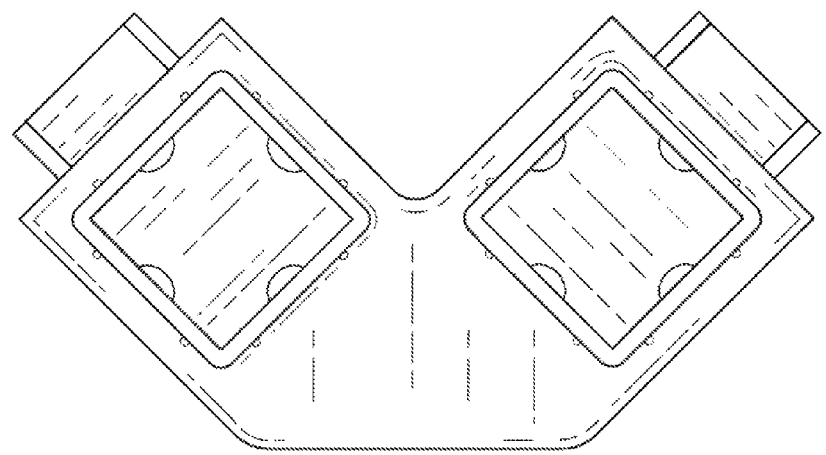
Figure 18A:
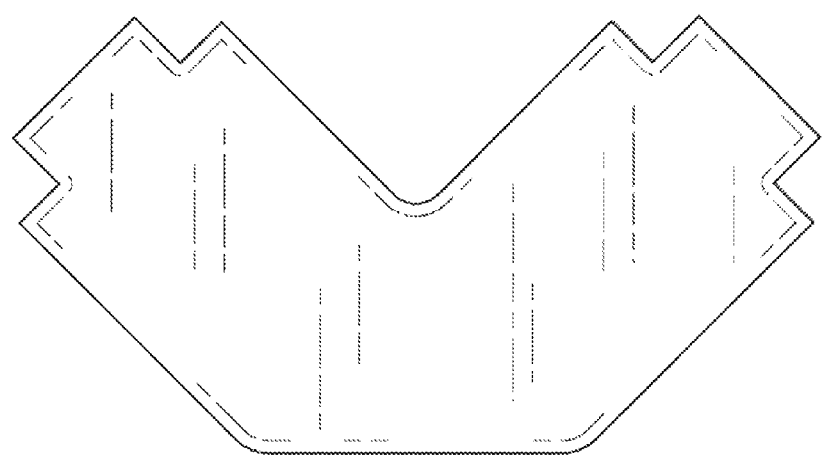

Referring to FIGS. 15, 16, 17A, 17B, 18A, and 18B, any of multi-positional multi-directional anti-twisting anti-bending self-locking self-centering single-shaft-clamp-couplers 101, multi-positional multi-directional anti-twisting anti-bending self-locking self-centering double-shaft-clamp-couplers 109, multi-positional multi-directional anti-twisting anti-bending self-locking self-centering double-shaft-couplers 117, and multi-positional multi-directional anti-twisting anti-bending self-locking self-centering double-clamp-couplers 123 can be molded in any angle. For example, multi-positional multi-directional anti-twisting anti-bending self-locking self-centering double-shaft-coupler 117 can be molded in an acute angle (FIG. 15 illustrates its front view), in an obtuse angle (FIG. 16 illustrates its front view), in an obtuse angle (FIGS. 17A and 17B illustrate its top and bottom views, respectively), or in a right angle (FIGS. 18A and 18B illustrate its top and bottom views, respectively).

Figure 19:
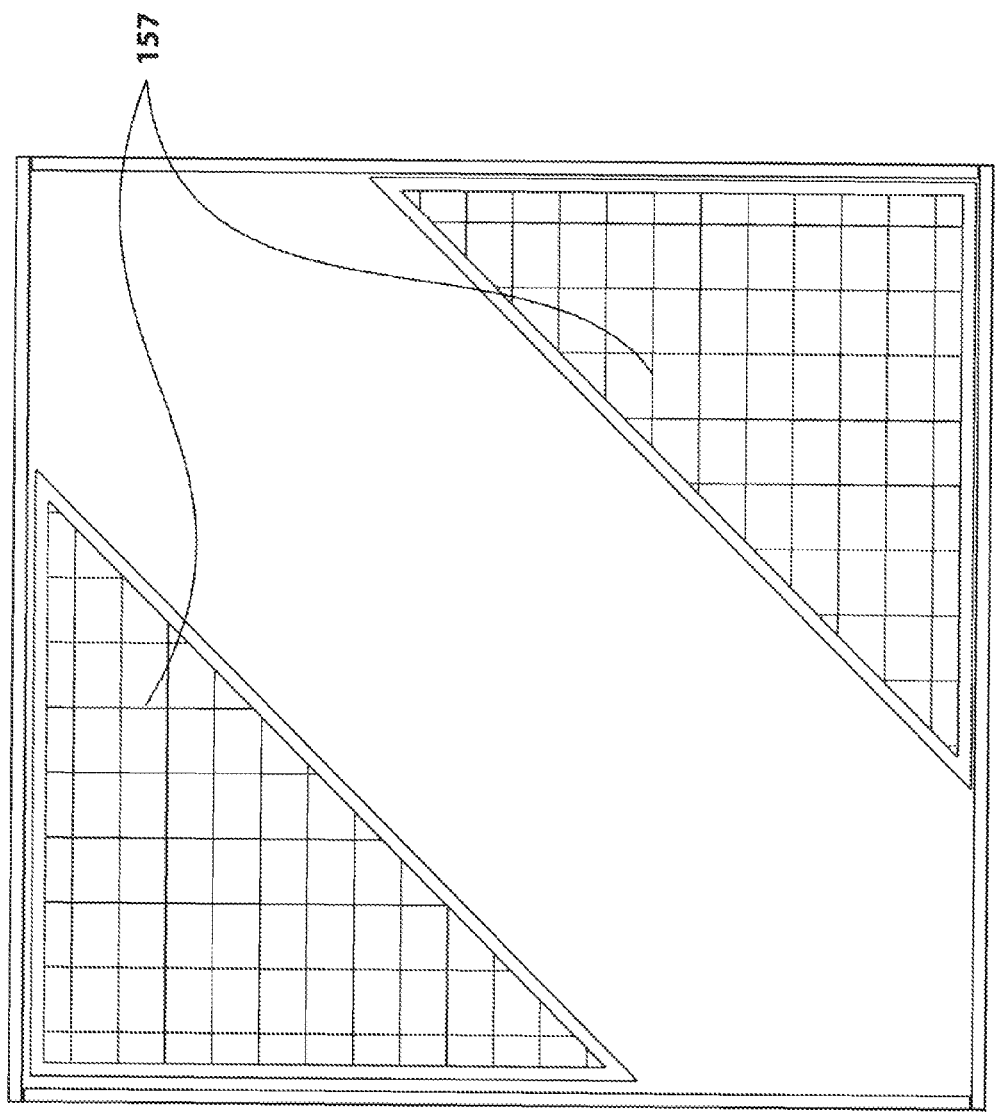
FIGS. 19, 20, 21, 22, 23, and 24 illustrate top views of variations the unique indoor-outdoor kennel for multiple types of animals, using stackable, interchangeable, expandable, and shrinkable modular roof panels, modular truss panels, modular wall panels, modular floor panels, detachable doorframe, and detachable door.
Figure 20:
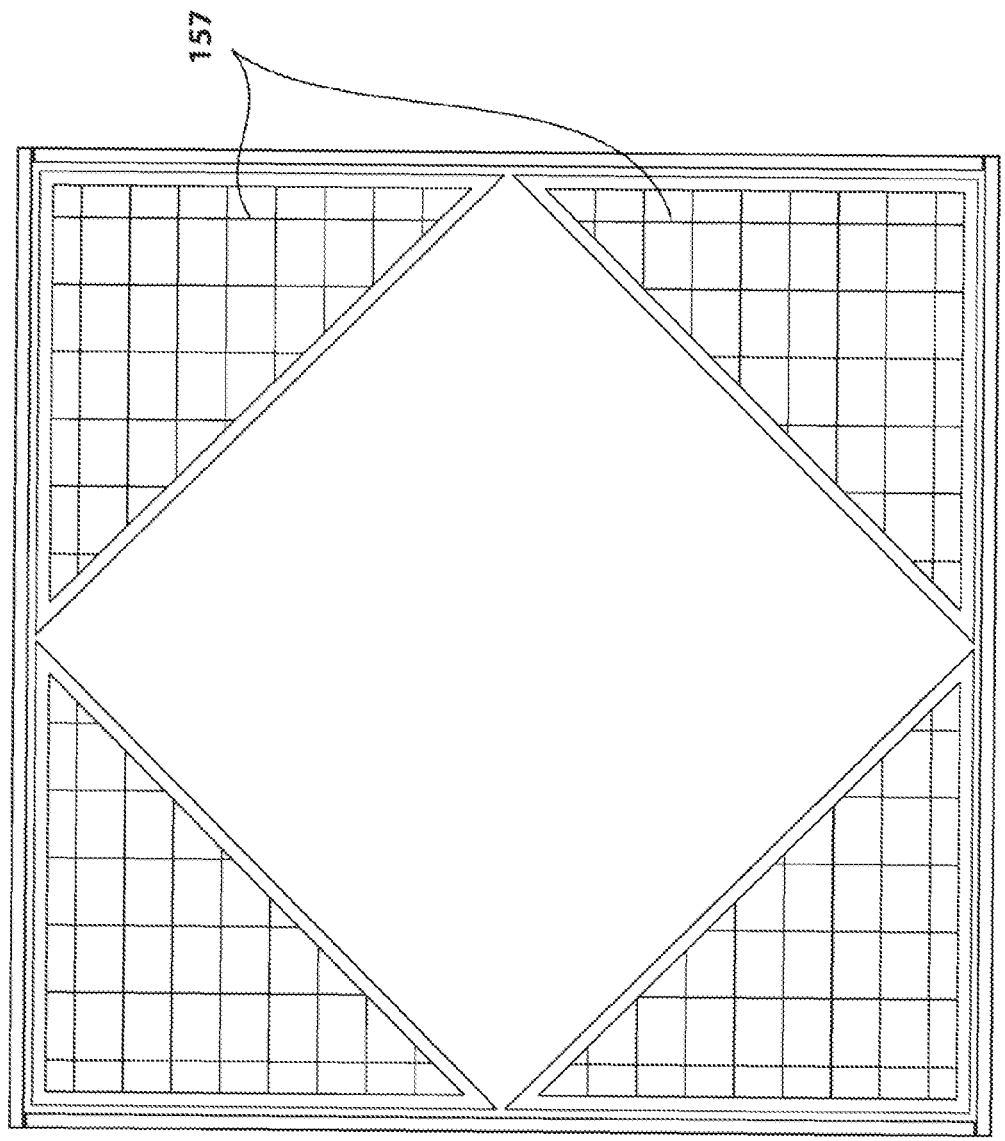

The unique indoor-outdoor kennel for multiple types of animals can have any shape and size. For example, modular truss panels 157, each equivalent to modular truss panel 130, can be used to build perches inside the unique indoor-outdoor kennel (FIGS. 19 and 20 illustrate top views of the unique indoor-outdoor kennel for multiple types of animals).

Figure 21:
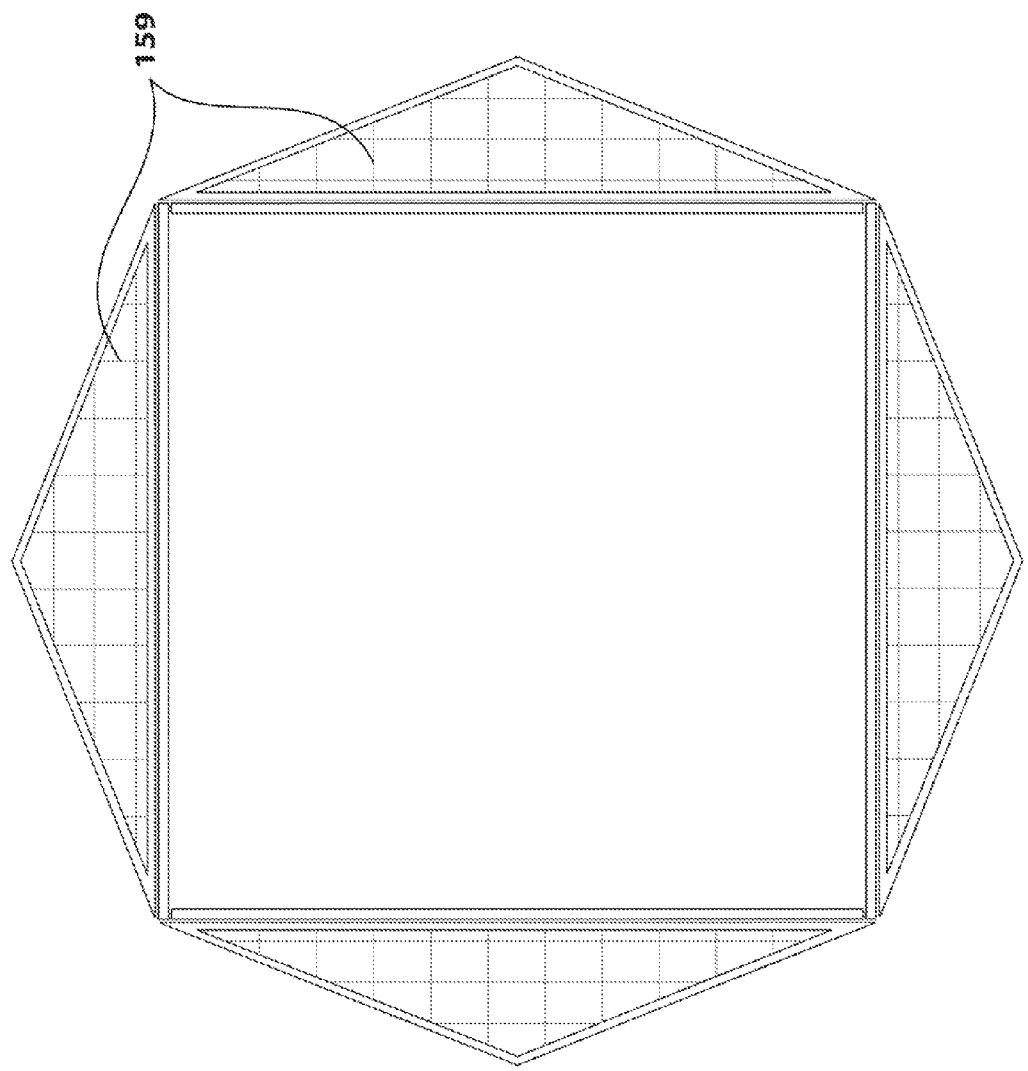
Figure 22:
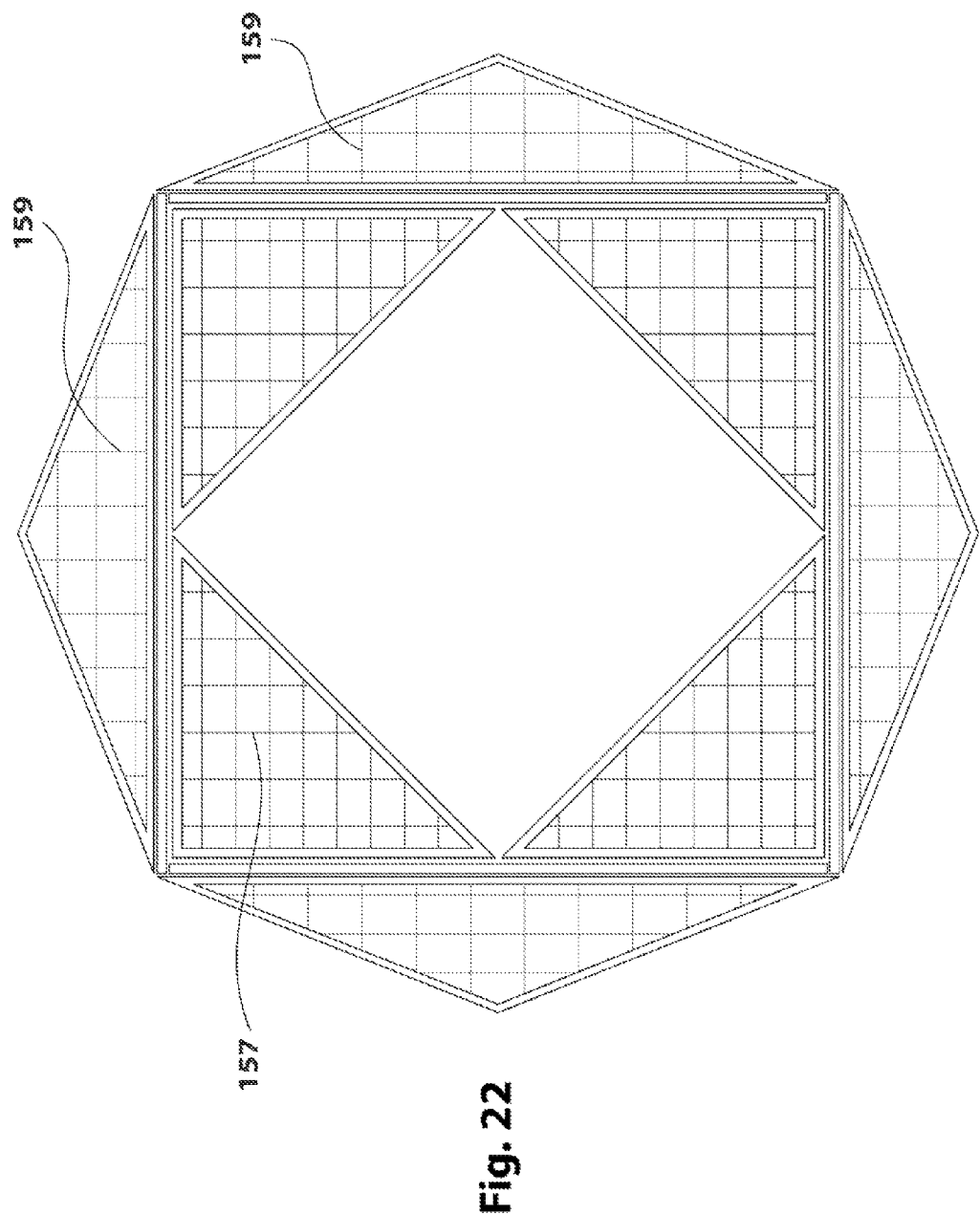

The unique indoor-outdoor kennel for multiple types of animals can have any shape and size. For example, modular truss panels 157 and 159, each equivalent to modular truss panel 130, can be used to build perches inside or outside the unique indoor-outdoor kennel (FIGS. 21 and 22 illustrate top views of the unique indoor-outdoor kennel for multiple types of animals).

Figure 23:
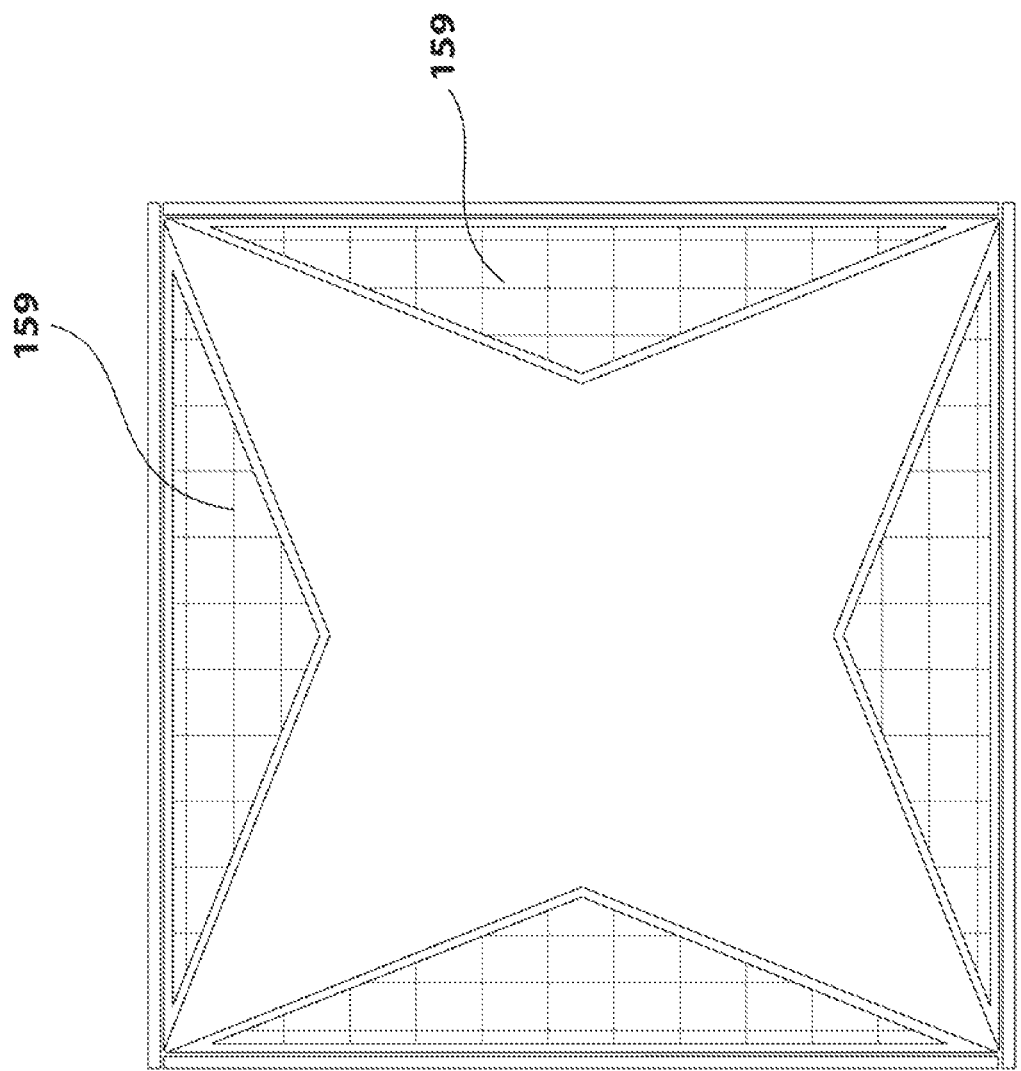
Figure 24:
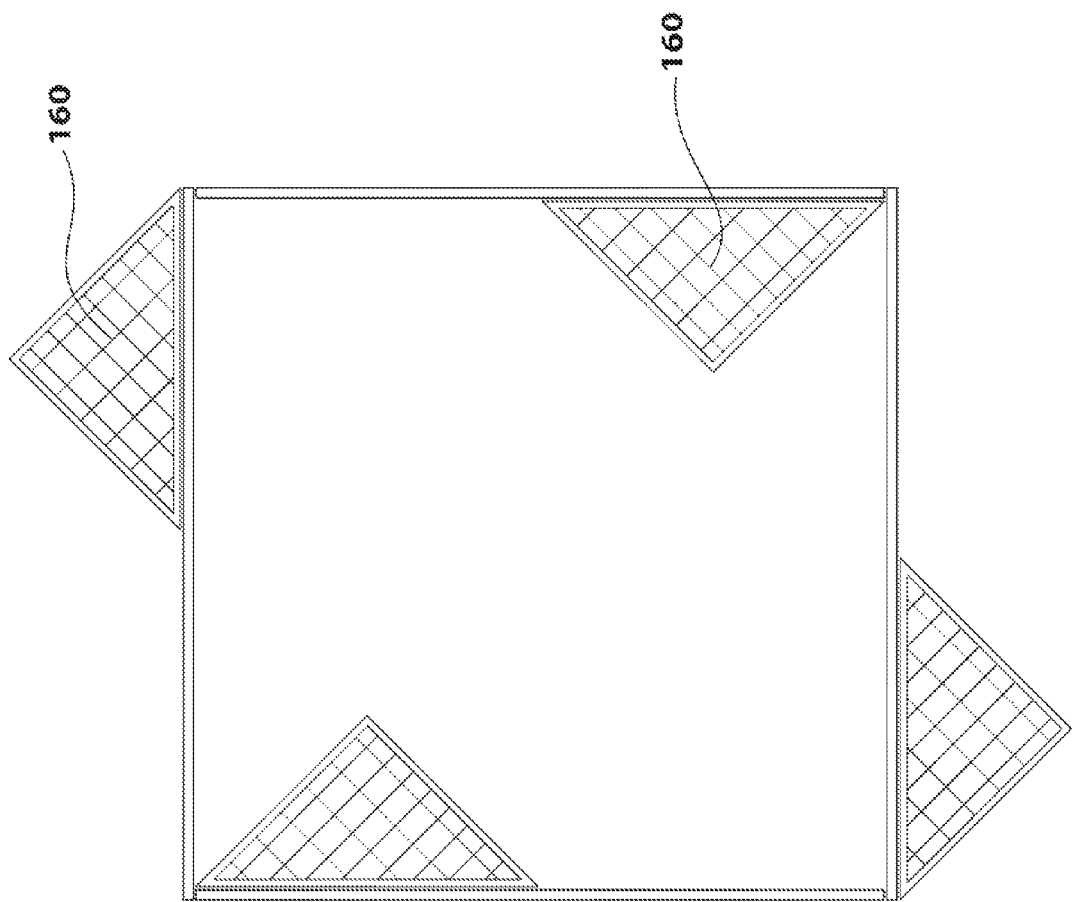

For example, modular truss panels 159 and 160, each equivalent to modular truss panel 130, can be used to build perches inside or outside the unique indoor-outdoor kennel (FIGS. 23 and 24 illustrate top views of the unique indoor-outdoor kennel for multiple types of animals).

Figure 25:
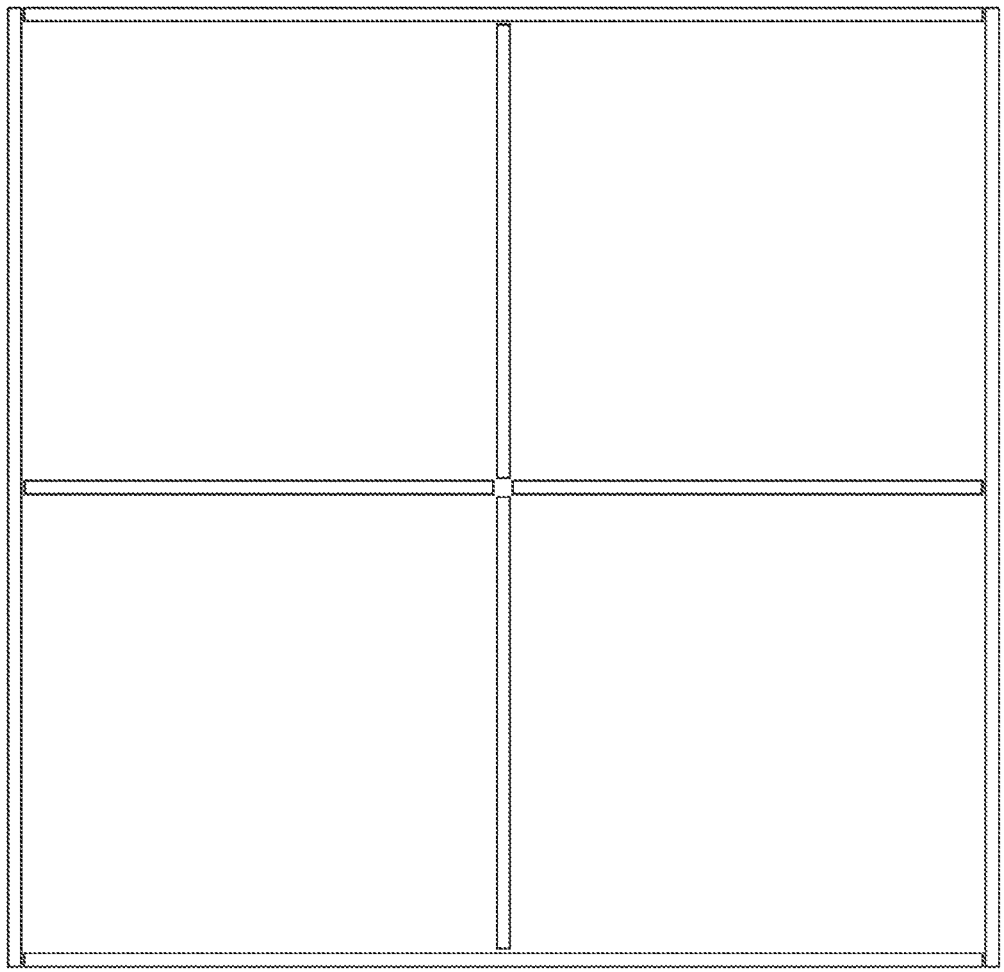
FIGS. 25, 26, 27, and 28 illustrate top views of different sample shapes of the unique indoor-outdoor kennel for multiple types of animals, using stackable, interchangeable, expandable, and shrinkable modular roof panels, modular truss panels, modular wall panels, modular floor panels, detachable doorframe, and detachable door.
Figure 26:
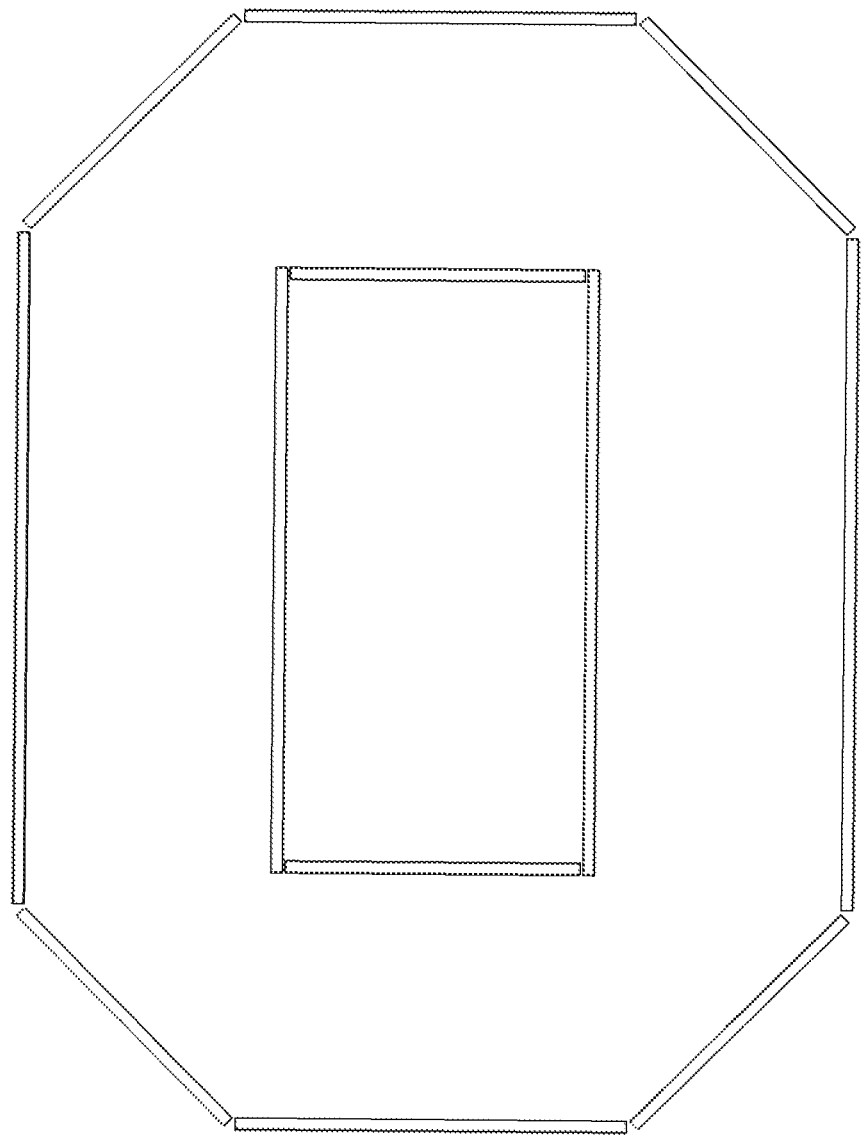
Figure 27:
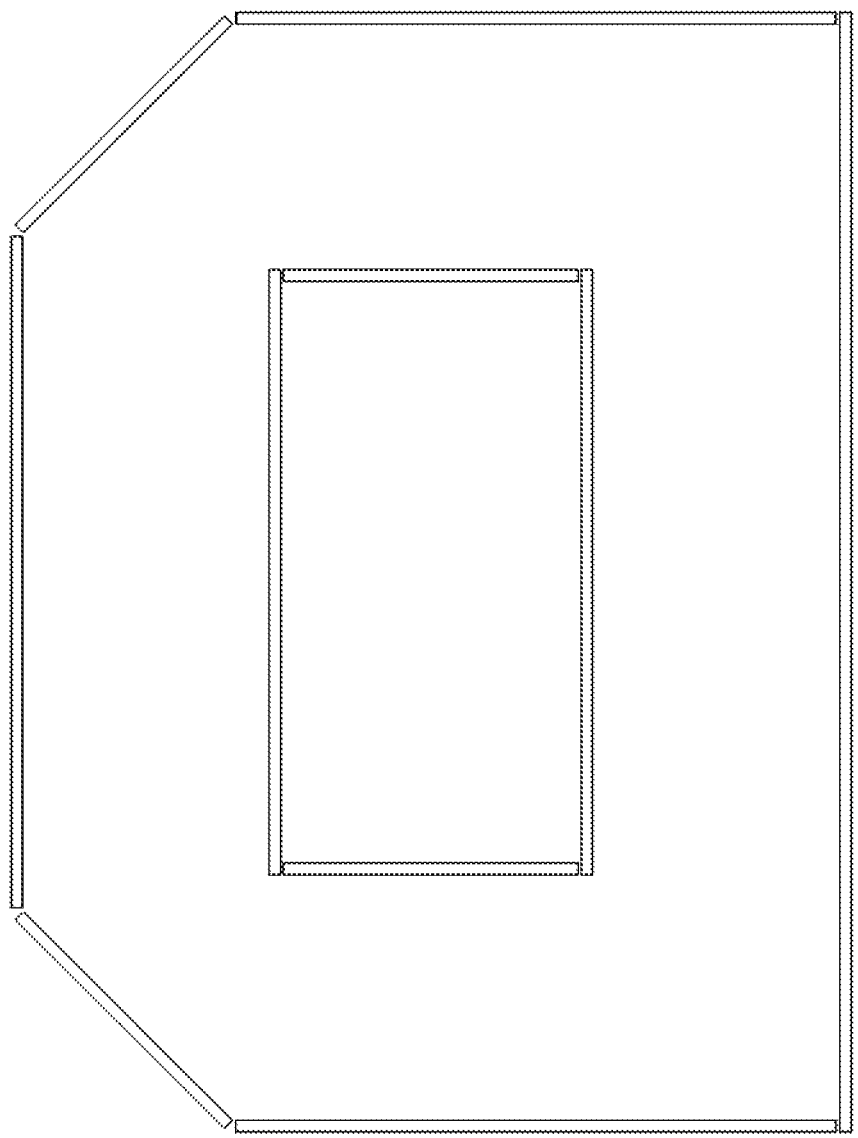
Figure 28:
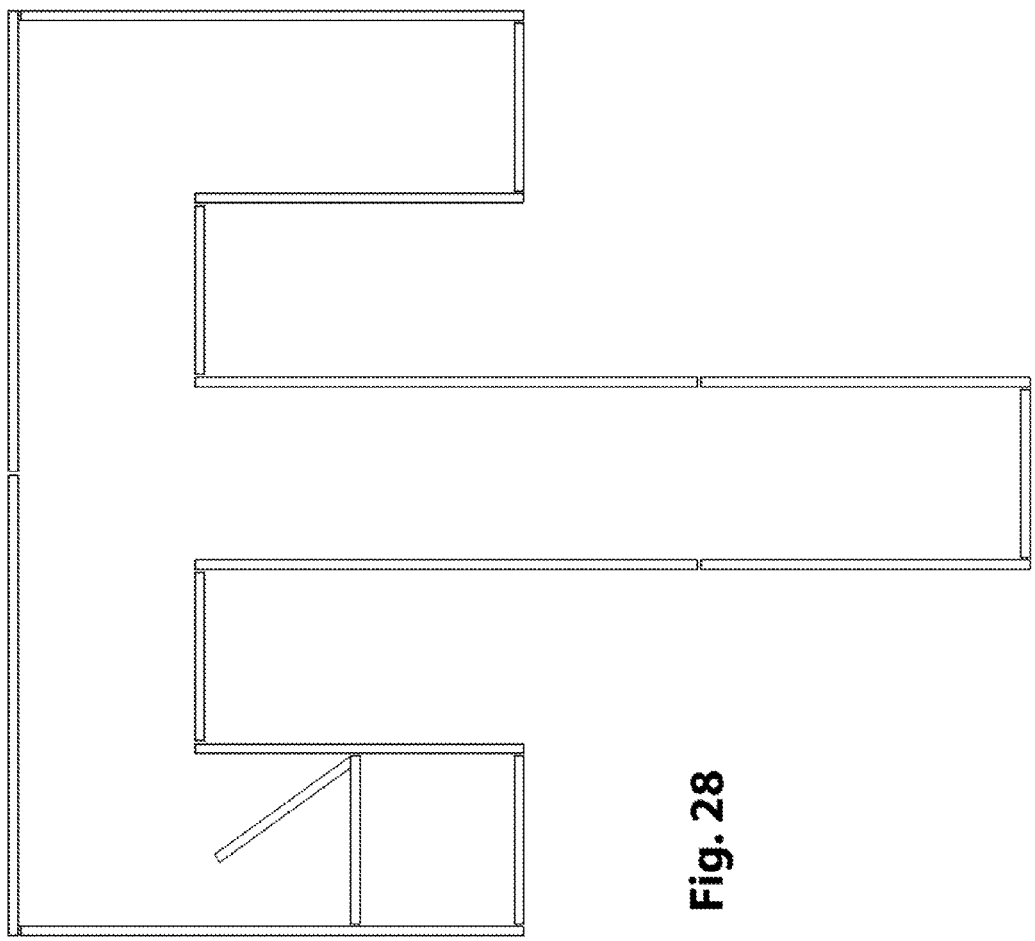

The unique indoor-outdoor kennel for multiple types of animals can have any shape and size. For example, (using the stackable, interchangeable, expandable, and shrinkable modular roof panels, modular truss panels, modular wall panels, modular floor panels, detachable doorframe, and detachable door) the unique indoor-outdoor kennel for multiple types of animals can built as:
1) A kennel expanding or being divided into many quarters
   (FIG. 25 illustrates a top view of the unique reconfigurable quick-assembly quick-disassembly indoor-outdoor kennel),
2) A letter-O-shaped animal run
   (FIG. 26 illustrates a top view of the unique reconfigurable quick-assembly quick-disassembly indoor-outdoor kennel),
3) A letter-D-shaped animal run
   (FIG. 27 illustrates a top view of the unique reconfigurable quick-assembly quick-disassembly indoor-outdoor kennel), or
4) A letter-T-shaped training kennel having a separated gated quarter for handling multiple animals at the same time
   (FIG. 28 illustrates a top view of the unique reconfigurable quick-assembly quick-disassembly indoor-outdoor kennel).

As described in the function section above, all single-shaft-clamp-couplers 101, double-shaft-clamp-couplers 109, double-shaft-couplers 117, and double-clamp-couplers 123 can quickly and easily center, align, and snap-lock together all roof panels 126, truss panels 130, wall panels 133, floor panels 137, and doorframe 141 (without using any tools). As a result, the unique reconfigurable expandable shrinkable quick-assembly quick-disassembly indoor-outdoor kennel for multiple types of animals can be quickly and easily assembled and disassembled (by hand). For example, as illustrated in FIGS. 2A, 2B, 2D and 2E, self-locking self-centering nipples 112, self-locking self-centering recesses 113, and recesses 161 on the outer surface of the tubes of roof panels 126, truss panels 130, wall panels 133, floor panels 137, and doorframe 141 can quickly and easily center, align, and snap-lock roof together panels 126, truss panels 130, wall panels 133, floor panels 137, and doorframe 141 (without using any tools).

As described in the function section above, all single-shaft-clamp-couplers 101, double-shaft-clamp-couplers 109, double-shaft-couplers 117, and double-clamp-couplers 123:
  Can offsettingly couple together all the tube ends of all the panels,
  Can prevent all the panels from twisting, warping, bending,
  Can prevent all the panels from sliding, spreading apart, and
  Can couple together all the panels (without using any tools).

Figure 30:
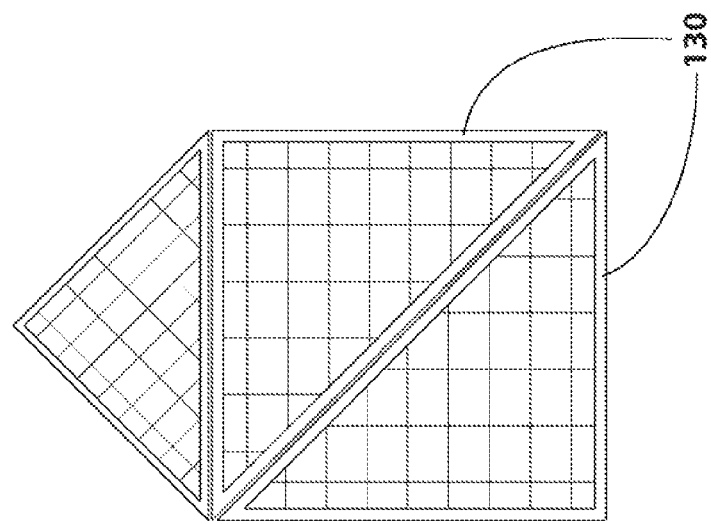
FIGS. 29, 30, 31, and 32 illustrate front views of modular roof panels, modular truss panels, modular wall panels, modular floor panels, detachable doorframe, and detachable door, which are stackable, interchangeable, expandable, and shrinkable.
Figure 29:
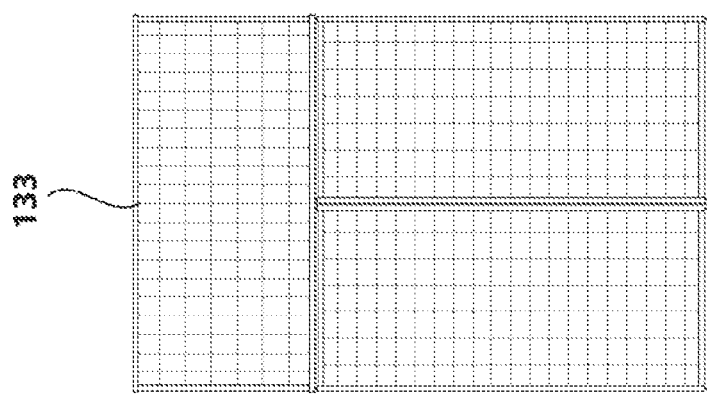
Figure 32:
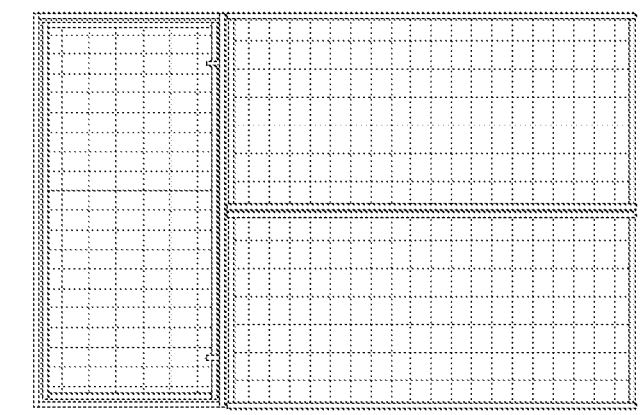
Figure 31:
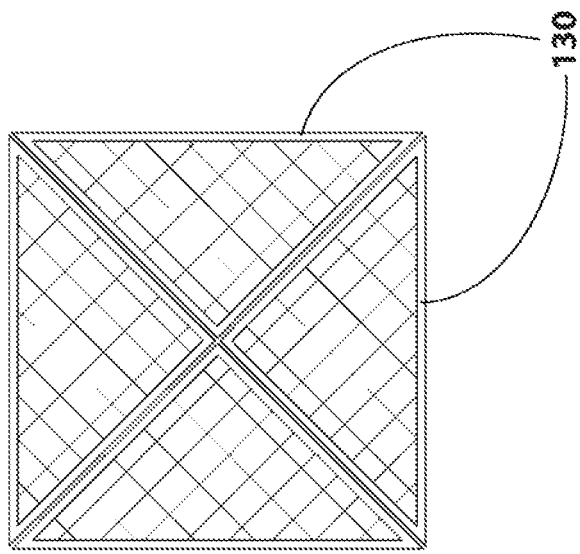

As described in the variation section above, roof panels 126, truss panel 130, wall panels 133, floor panels 137, doorframe panel 141, and door panel 148 are stackable, interchangeable, expandable, and shrinkable. For example, FIG. 29 illustrates wall panel 133, which can be used as a truss panel. FIG. 30 illustrates truss panel 130, which can be used as a wall panel. FIG. 31 illustrates truss panel 130, which can be used as a floor panel or roof panel. FIG. 32 illustrates door frame 141 and door panel 148 (FIG. 8), which can be used as a roof panel. A tarp can be used on top of the unique indoor-outdoor kennel.

MAJOR ADVANTAGES OF THE INVENTION

The present invention substantially departs from the conventional concepts and designs of the prior art. In doing so, the present invention provides a unique reconfigurable expandable shrinkable quick-assembly quick-disassembly indoor-outdoor kennel for multiple types of animals having many unique and significant features, functions, and advantages, which overcome all the disadvantages of the prior art, as follows:
  1) It is an object of the present invention to provide the unique reconfigurable expandable shrinkable quick-assembly quick-disassembly indoor-outdoor kennel, which:
    a) Has stackable, interchangeable, expandable, and shrinkable panels, any of which:
      Can be used as either a roof panel, truss panel, wall panel, floor panel, door panel, ramp panel, perch panel, or storage panel
      (to eliminate the needs for a specific panel for a specific function,
      to reduce production costs, to save money for customers,
      to reduce kennel-assembling time, and to provide ease of use),
      Can be coupled with other panels at any angle,
      Can be used as an inner or outer panel (i.e., dividing-wall panel for multiple kennels in one, dividing-floor panel for multiple levels, ramp panel, or perch panel),
b) Has unique offset couplers, which can offsettingly couple together the tube ends of the roof panels, truss panels, wall panels, floor panels, door panels, ramp panels, perch panels, and storage panel,
c) Has unique centering, aligning, and coupling couplers, which can center, align, and couple all the roof panels, truss panels, wall panels, floor panels, door panels, ramp panels, perch panels, and storage panel,
d) Can be quickly and easily assembled and disassembled by hand, (eliminating the need for using any tools),
e) Prevents all the panels from twisting, bending, and collapsing when pushed, for example, by pets,
f) Saves materials, saves labor, saves time, and saves money,
g) Provides reliability and convenience, and
h) Prolongs the service lifespan of the unique indoor-outdoor kennel (by using single-shaft-clamp-couplers, double-shaft-clamp-couplers, double-shaft-couplers, and double-clamp-couplers, all of which can quickly and easily couple and decouple the roof panels, truss panels, wall panels, floor panels, door panels, ramp panels, and perch panels of the unique indoor-outdoor kennel, to allow all the panels to be quickly and easily assembled and disassembled (without using any tools).

2) It is another object of the present invention to provide the unique reconfigurable expandable shrinkable quick-assembly quick-disassembly indoor-outdoor kennel, which:
 a) Has unique coupler, which can perform the following four functions, at the same time:
  Sealing the sharp edges of the tube ends of its roof panels, truss panels, wall panels, floor panels, door panels, ramp panels, perch panels, and storage panels,
  Preventing its roof panels, truss panels, wall panels, floor panels, door panels, ramp panels, perch panels, and storage panels from twisting, bending, and warping,
  Preventing its roof panels, truss panels, wall panels, floor panels, door panels, ramp panels, perch panels, and storage panels from sliding, spreading apart, and
  Coupling its roof panels, truss panels, wall panels, floor panels, door panels, ramp panels, perch panels, and storage panels,
 b) Eliminates a lot of injuries, the needs for tetanus shots, and medical expenses,
 c) Prevents the unique indoor-outdoor kennel from collapsing,
 d) Retains its intended shape, and
 e) Prolongs the service lifespan of the unique indoor-outdoor kennel (by using square single-shaft-clamp-couplers, square double-shaft-clamp-couplers, square double-shaft-couplers, and square double-clamp-couplers, all of which are inserted into the tube ends of the roof panels, truss panels, wall panels, floor panels, door panels, ramp panels, and perch panels of the unique indoor-outdoor kennel, to seal the tube ends, to cover the sharp edges of the tube ends, and to prevent all the panels from twisting, bending, and collapsing when pushed, for example, by animals).

3) It is a further object of the present invention to provide the unique reconfigurable expandable shrinkable quick-assembly quick-disassembly indoor-outdoor kennel, which:
 a) Prevents its couplers from rusting,
 b) Prevents its couplers from accidentally cutting pets,
 c) Eliminates a lot of injuries, and
 d) Eliminates the needs for tetanus shots and medical expenses (by using single-shaft-clamp-couplers, double-shaft-clamp-couplers, double-shaft-couplers, and double-clamp-couplers, all of which are made of plastic with rounded edges and corners, to prevent them from rusting and cutting animals).

4) It is an even further object of the present invention to provide the unique reconfigurable expandable shrinkable quick-assembly quick-disassembly indoor-outdoor kennel, which can be quickly and easily configured to have a wide variety of shapes and sizes. For example, the unique indoor-outdoor kennel can be assembled to have:
 a) Alphanumeric or geometric shapes and sizes,
 b) Man-made or nature-made shapes and sizes,
 c) Multiple roof, truss, wall, floor, ramp, or perch levels, and
 d) Multiple inner and outer roofs, trusses, walls, floors, doors, ramps, perches, and storages (by using single-shaft-clamp-couplers, double-shaft-clamp-couplers, double-shaft-couplers, and double-clamp-couplers, all of which can couple the roof panels, truss panels, wall panels, floor panels, door panels, ramp panels, and perch panels of the unique indoor-outdoor kennel at any angles (for example, acute, right, obtuse, straight, reflex, or full angles).

5) It is another object of the present invention to provide the unique reconfigurable expandable shrinkable quick-assembly quick-disassembly indoor-outdoor kennel, which:
 a) Eliminates all holes to be drilled into all the panels,
 b) Eliminates all protrusions to be welded or otherwise attached to all the panels, and
 c) Eliminates all additional apparatus to be welded or otherwise attached or built into all the panels (by using single-shaft-clamp-couplers, double-shaft-clamp-couplers, double-shaft-couplers, and double-clamp-couplers, all of which can quickly and easily be snapped on and snapped off the roof panels, truss panels, wall panels, floor panels, door panels, ramp panels, and perch panels of the unique indoor-outdoor kennel, to quickly and easily assemble and disassemble the unique indoor-outdoor kennel).

6) It is yet another object of the present invention to provide the unique reconfigurable expandable shrinkable quick-assembly quick-disassembly indoor-outdoor kennel, which:
 a) Can be quickly and easily assembled and disassembled (by hand),
 b) Can be quickly and easily stored in a car trunk and transported (i.e., to a park or a beach),
 c) Can be used inside (i.e., inside a house) and outside (i.e., outside a house), and
 d) Can provide convenience, ease of use, and save time (by using single-shaft-clamp-couplers, double-shaft-clamp-couplers, double-shaft-couplers, and double-clamp-couplers, all of which can quickly and easily couple and decouple the roof panels, truss panels, wall panels, floor panels, door panels, ramp panels, and perch panels of the unique indoor-outdoor kennel (without using any tools).

7) It is still yet another object of the present invention to provide the unique reconfigurable expandable shrinkable quick-assembly quick-disassembly indoor-outdoor kennel, which:
 a) Can be configured to have at least one concave roof, to perform triple functions of:

Functioning as a storage to store foods, toys, leash, accessories thereon,
Functioning as a terrace, and
Functioning as a roof,
b) Can be configured to have at least one flat roof to perform triple functions of:
Functioning as a perch,
Functioning as a terrace, and
Functioning as a roof,
c) Can be configured to have at least one convex roof, to perform triple functions of:
Functioning as a ramp,
Functioning as a terrace, and
Functioning as a roof,
d) Can be configured to have at least one set of upper and lower floors:
To let pet feces fall through the upper floor and stay on the lower floors, and
To keep pets stay on the upper floor away from their feces.
e) Can be configured to have at least one inside or outside ramp and/or perch
(by using single-shaft-clamp-couplers, double-shaft-clamp-couplers, double-shaft-couplers, and double-clamp-couplers, all of which can couple the roof panels of the unique indoor-outdoor kennel in any angles).

8) It is still yet an even further object of the present invention to provide the unique reconfigurable expandable shrinkable quick-assembly quick-disassembly indoor-outdoor kennel, which can perform five following different functions. It:
a) Can be used as an enclosed kennel,
b) Can be used as a pet run,
c) Can be used as a pet-training pen,
d) Can be used as a pet-transporting crate, and
e) Can be used as a pet cage
(by using single-shaft-clamp-couplers, double-shaft-clamp-couplers, double-shaft-couplers, and double-clamp-couplers, all of which can quickly and easily couple and decouple the roof panels, truss panels, wall panels, floor panels, door panels, ramp panels, and perch panels of the unique indoor-outdoor kennel (without using any tools).

9) It is still yet an even further object of the present invention to provide the unique reconfigurable expandable shrinkable quick-assembly quick-disassembly indoor-outdoor kennel, which:
a) Is scalable to be small (i.e., for birds or mice), and
b) Is scalable to be large (i.e., for chickens or large breed dogs)
(by using single-shaft-clamp-couplers, double-shaft-clamp-couplers, double-shaft-couplers, and double-clamp-couplers, all of which can quickly and easily couple and decouple the roof panels, truss panels, wall panels, floor panels, door panels, ramp panels, and perch panels of the unique indoor-outdoor kennel (without using any tools).

What is claimed is:

1. A reconfigurable kennel comprising:
a plurality of panels, each of said panels comprising a plurality of panel tubes welded together to define a panel frame, and a panel mesh welded to said panel frame, each of said panel tubes having at least one panel-tube surface, at least one panel-tube recess formed on said at least one panel-tube surface, and two opposite panel-tube ends;
a doorframe, said doorframe comprising a plurality of doorframe tubes welded together to define said doorframe and a plurality of latch holes drilled therein, each of said doorframe tubes having at least one doorframe-tube surface, at least one doorframe-tube recess formed on said at least one doorframe-tube surface, and two opposite doorframe-tube ends;
a plurality of hinges, said hinges attached to said doorframe;
a door, said door attached to said hinges and releasably latched to said doorframe;
a plurality of latches, each of said latches slidably attached to said door, each of said latches for being releasably slid into respective said latch holes to lock said door to said doorframe;
a plurality of first couplers, each of said first couplers comprising a first-coupler shaft, a first-coupler clamp offsettingly molded to said first-coupler shaft, first-coupler nipples molded to said first-coupler clamp, first-coupler recesses molded on said first-coupler shaft, first-coupler ribs molded on said first-coupler shaft, and a first-coupler cap molded on said first-coupler shaft;
a plurality of second couplers, each of said second couplers comprising second-coupler double shafts, a second-coupler clamp centrally molded to said second-coupler double shafts, second-coupler nipples molded to said second-coupler clamp, second-coupler recesses molded on said second-coupler double shafts, second-coupler ribs molded on said second-coupler double shafts, second-coupler double caps molded on said second-coupler double shafts, and second-coupler double levers molded to said second-coupler double caps;
a plurality of third couplers, each of said third couplers comprising third-coupler double shafts, third-coupler recesses molded on said third-coupler double shafts, third-coupler ribs molded on said third-coupler double shafts, third-coupler double caps molded on said third-coupler double shafts, and third-coupler double levers molded to said third-coupler double caps; and
a plurality of fourth couplers, each of said fourth couplers comprising fourth-coupler double clamps and fourth-coupler nipples molded to said fourth-coupler double clamps,
wherein each said first-coupler shaft, each said second-coupler double shafts, and each said third-coupler double shafts are for coupling said panels by being inserted into respective ones of said panel-tube ends,
wherein each said first-coupler clamp, each said second-coupler clamp, and each said fourth-coupler double clamp are for coupling said panels by clamping on respective said panel tubes,
wherein,
each said first-coupler nipple, each said second-coupler nipple, and each said fourth-coupler nipple are for snap-locking in a respective said at least one panel-tube recess and said at least one doorframe-tube recess to center, align, and lock said respective panels and said doorframe,
each said first-coupler recess, each said second-coupler recess, and each said third-coupler recess are for snap-locking on a respective one of said at least one panel-tube recess and said at least one doorframe-tube recess to center, align, and lock said respective panels and said doorframe,
each said first-coupler ribs, each said second-coupler ribs, and each said third-coupler ribs are for being inserted into respective ones of said panel-tube ends and respective ones of said doorframe-tube ends to center respective ones of said first-coupler shafts, said second-coupler double shafts, and said third-coupler double shafts therein, each said first-coupler caps, each said second-coupler double caps, and each said third-coupler doublecaps are for sealing respective ones of said panel-tube ends and said doorframe-tube ends, each said second-coupler double levers and each said third-coupler double levers are for being pulled on to disassemble respective ones of said first couplers, said second couplers, and said third couplers from said panel-tube ends and said doorframe-tube ends.

2. The reconfigurable kennel of claim 1, wherein each of said first-coupler shafts, said second-coupler double shafts, said third-coupler double shafts has a square or rectangular cross-section.

3. The reconfigurable kennel of claim 1, wherein each of said panel tubes and said doorframe tubes has a square or rectangular cross-section.

4. The reconfigurable kennel of claim 1, wherein at least one of said panels is on an inside of the reconfigurable kennel.

5. The reconfigurable kennel of claim 1, wherein at least one of said panels is on an outside of the reconfigurable kennel.

6. The reconfigurable kennel of claim 1, wherein at least one of said panels is stacked on at least one other of said panels.

7. The reconfigurable kennel of claim 1, wherein each of said panels is configured to be used as a panel selected from the group consisting of: roof, truss, wall, floor, ramp, perch, and storage container.

8. The reconfigurable kennel of claim 1, wherein each of said panels is configured to be used as a panel selected from the group consisting of: inner or outer roof, inner or outer truss, inner or outer wall, inner or outer floor, inner or outer ramp, inner or outer perch, and inner or outer storage container.

9. The reconfigurable kennel of claim 1, wherein the reconfigurable kennel is divided into multiple kennels.

10. The reconfigurable kennel of claim 1, further comprising at least one tarp for partially or entirely covering the reconfigurable kennel.

11. The reconfigurable kennel of claim 1, wherein said first couplers, said second couplers, said third couplers, and said fourth couplers are made of plastic.

12. The reconfigurable kennel of claim 1, wherein the reconfigurable kennel is used as a kennel selected from the group consisting of: an enclosed kennel, a pet run, a pet-training pen, a pet-transporting crate, and a pet cage.

13. The reconfigurable kennel of claim 1, wherein the reconfigurable kennel has alphanumeric shape.

14. A reconfigurable kennel, comprising: a plurality of panels, each of said panels comprising a plurality of panel tubes welded together to define a panel frame, and a panel mesh welded to said panel frame, each of said panel tubes having at least one panel-tube surface, at least one panel-tube recess formed on said at least one panel-tube surface, and two opposite panel-tube ends;

a doorframe, said doorframe comprising a plurality of doorframe tubes welded together to define said doorframe and a plurality of latch holes drilled therein, each of said doorframe tubes having at least one doorframe-tube surface, at least one doorframe-tube recess formed on said at least one doorframe-tube surface, and two opposite doorframe-tube ends;

a plurality of hinges, said hinges attached to said doorframe;

a door, said door attached to said hinges and releasably latched to said doorframe;

a plurality of latches, each of said latches slidably attached to said door, each of said latches for being releasably slid into respective said latch holes to lock said door to said doorframe;

a plurality of first couplers, each of said first couplers comprising a first-coupler shaft, a first-coupler clamp molded to said first-coupler shaft, first-coupler nipples molded to said first-coupler clamp, first-coupler recesses molded on said first-coupler shaft, first-coupler ribs molded on said first-coupler shaft, and a first-coupler cap molded on said first-coupler shaft;

a plurality of second couplers, each of said second couplers comprising second-coupler double shafts, a second-coupler clamp molded to said second-coupler double shafts, second-coupler nipples molded to said second-coupler clamp, second-coupler recesses molded on said second-coupler double shafts, second-coupler ribs molded on said second-coupler double shafts, second-coupler double caps molded on said second-coupler double shafts, and second-coupler double levers molded to said second-coupler double caps;

a plurality of third couplers, each of said third couplers comprising third-coupler double shafts, third-coupler recesses molded on said third-coupler double shafts, third-coupler ribs molded on said third-coupler double shafts, third-coupler double caps molded on said third-coupler double shafts, and third-coupler double levers molded to said third-coupler double caps; and a plurality of fourth couplers, each of said fourth couplers comprising fourth-coupler double clamps and fourth-coupler nipples molded to said fourth-coupler double clamps;

wherein each said first-coupler shaft, each said second-coupler double shafts, and each said third-coupler double shaft are for coupling said panels by being inserted into a respective one of said panel-tube ends and said doorframe-tube ends to couple them, wherein each said first-coupler clamp, each said second-coupler clamp, and each said fourth-coupler double clamp are for coupling said panels by clamping on respective ones of said panel tubes, wherein said panels for being stackable and interchangeable, said panels for functioning as roof panels, truss panels, wall panels, floor panels, ramp panels, perch panels, or storage container panels, each said first-coupler clamps for offsettingly snap-clamping on respective ones of said panel-tube ends to offsettingly couple said respective panel-tube ends, each said second-coupler clamps for centrally snap-clamping on respective ones of said panel tubes to centrally couple said respective panel tubes, each said fourth-coupler double clamps for doubly snap-clamping on respective ones of said panel tubes and respective ones of said doorframe tubes to doubly couple said respective panel tubes and said respective doorframe tubes, each of said first-coupler nipples, each of said second-coupler nipples, and each of said fourth-coupler nipples for snap-locking in a respective said at least one panel-tube recess and a respective said at least one doorframe-tube recess to center, align, and lock said respective panels and said doorframe, each of said first-coupler recesses, each of said second-coupler recesses, and each of said third-coupler recesses are for snap-locking on a respective said at least one panel-tube recess and a respective said at least one doorframe-tube recess to center, align, and lock said respective panels and said doorframe, each of said first-coupler ribs, each of said second-coupler ribs, and each of said third-coupler ribs are for being inserted into respective said panel-tube ends and respective said doorframe-tube ends to center respective said first-coupler shafts, respective said second-coupler double shafts, and respective said third-coupler double shafts therein, each of said first-coupler caps, each of said second-coupler double caps, and each of said third-coupler double caps are for sealing respective said panel-tube ends and respective said doorframe-tube ends, each of said second-coupler double levers and each of said third-coupler double levers are for being pulled on to disassemble said respective first couplers, said respective second couplers, and respective said third couplers from said respective panel-tube ends and said respective doorframe-tube ends.

15. The reconfigurable kennel of claim 14, wherein at least one of said panels is on an inside of the reconfigurable kennel.

16. The reconfigurable kennel of claim 14, wherein at least one of said panels is on an outside of the reconfigurable kennel.

17. The reconfigurable kennel of claim 14, wherein at least one of said panels is stacked on at least one other of said panels.

18. The reconfigurable kennel for animals of claim 14, wherein each of said panels is configured to be used as a panel selected from the group consisting of: inner or outer roof, inner or outer truss, inner or outer wall, inner or outer floor, inner or outer ramp, inner or outer perch, and inner or outer storage container.

19. The reconfigurable kennel of claim 14, wherein the reconfigurable kennel is used as a kennel selected from the group consisting of: an enclosed kennel, a pet run, a pet-training pen, a pet-transporting crate, and a pet cage.

20. The reconfigurable kennel of claim 14, wherein each of said panels is configured for use as a panel for forming a structure that is selected from the group consisting of: upper or lower roof, upper or lower truss, upper or lower wall, upper or lower floor, upper or lower ramp, upper or lower perch, and upper or lower storage container.

* * * * *